United States Patent
Chen et al.

(10) Patent No.: US 10,735,156 B2
(45) Date of Patent: Aug. 4, 2020

(54) SOUNDING REFERENCE SIGNAL TRANSMISSION FOR ENHANCED CARRIER AGGREGATION

(71) Applicant: QUALCOMM Incorporated, San Diego, CA (US)

(72) Inventors: Wanshi Chen, San Diego, CA (US); Peter Gaal, San Diego, CA (US); Renqiu Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 23 days.

(21) Appl. No.: 15/467,459

(22) Filed: Mar. 23, 2017

(65) Prior Publication Data

US 2017/0279580 A1 Sep. 28, 2017

Related U.S. Application Data

(60) Provisional application No. 62/313,100, filed on Mar. 24, 2016.

(51) Int. Cl.
*H04L 5/00* (2006.01)
*H04L 5/14* (2006.01)
(Continued)

(52) U.S. Cl.
CPC ............ *H04L 5/0048* (2013.01); *H04L 5/001* (2013.01); *H04L 5/0094* (2013.01); *H04L 5/14* (2013.01);
(Continued)

(58) Field of Classification Search
CPC ..... H04L 5/0048; H04L 5/001; H04L 5/0094; H04L 5/14; H04W 72/042; H04W 72/0446; H04W 74/0833
See application file for complete search history.

(56) References Cited

U.S. PATENT DOCUMENTS 9,951,530 B2 * 4/2018 Tarn .................... B32B 37/14
2012/0002643 A1 1/2012 Chung et al.
(Continued)

OTHER PUBLICATIONS

Catt, "L1 Support for Dual Connectivity," 3GPP TSG RAN WG1 Meeting #74, R1-133026, Barcelona, Spain, Aug. 19-23, 2013, 3 pgs., 3rd Generation Partnership Project.
Huawei et al., "Support for Carrier Selection/Switching in CA Enhancement," 3GPP TSG RAN WG1 Meeting #82, R1-154324, Beijing, China, Aug. 24-28, 2015, 8 pgs., XP051039455, 3rd Generation Partnership Project.
(Continued)

*Primary Examiner* — Ian N Moore
*Assistant Examiner* — Latresa A McCallum
(74) *Attorney, Agent, or Firm* — Dalei Dong; Holland & Hart LLP

(57) ABSTRACT

Methods, systems, and devices for wireless communication are described. A user equipment (UE) may indicate to a base station the number of uplink (UL) component carriers (CCs) that the UE is capable of supporting. A base station may configure the UE for carrier aggregation (CA) and for one or more auxiliary UL CCs. The CA configuration may include CCs for UL data transmissions and the auxiliary UL configuration may include CCs for UL reference signals or random access channel transmissions. The auxiliary UL CCs may thus be used for sounding reference signal (SRS) transmissions even if the UE is otherwise not configured for UL data transmissions on those CCs. UL data transmissions on the CA carriers may be sent at the same time as SRS transmissions or during different transmission time intervals (TTIs), depending on UE capability.

26 Claims, 19 Drawing Sheets

(51) Int. Cl.
H04W 72/04 (2009.01)
H04W 74/08 (2009.01)
(52) U.S. Cl.
CPC ..... *H04W 72/042* (2013.01); *H04W 72/0446* (2013.01); *H04W 74/0833* (2013.01); *H04L 5/1469* (2013.01)

(56) References Cited

U.S. PATENT DOCUMENTS

| | | | | |
|---|---|---|---|---|
| 2012/0257582 | A1* | 10/2012 | Damnjanovic | H04L 5/001 370/329 |
| 2012/0281654 | A1* | 11/2012 | Aiba | H04L 5/0007 370/329 |
| 2014/0112291 | A1* | 4/2014 | Hahn | H04W 16/10 370/329 |
| 2014/0254492 | A1* | 9/2014 | Noh | H04W 74/0833 370/328 |
| 2015/0181461 | A1 | 6/2015 | Kim et al. | |
| 2015/0334695 | A1* | 11/2015 | Kim | H04L 5/0051 370/329 |
| 2016/0143050 | A1 | 5/2016 | Saiwai et al. | |
| 2017/0164408 | A1* | 6/2017 | Takeda | H04W 74/0833 |

OTHER PUBLICATIONS

Huawei et al., "Support for SRS Switching Among TDD Scells in CA Enhancement," 3GPP TSG RAN WG1 Meeting #83, R1-156921, Anaheim, USA, Nov. 15-22, 2015, 7 pgs., XP051039950, 3rd Generation Partnership Project.

Huawei et al., "Support for SRS Switching among TDD Scells," 3GPP TSG-RAN WG2 Meeting #91, R2-154344, Malmo, Sweden, Oct. 5-9, 2015, 5 pgs., XP051004880, 3rd Generation Partnership Project.

ISA/EP, International Search Report and Written Opinion of the International Searching Authority, Int'l Application No. PCT/US2017/023992, dated Jun. 28, 2017, European Patent Office, Rijswijk, NL, 17 pgs.

NTT Docomo: "SRS Enhancement for Elevation BF and FD-MIMO", 3GPP TSG RAN WG1 Meeting #82, R1-154663, Beijing, China, Aug. 24-28, 2015, 3 pgs., XP051039542, 3rd Generation Partnership Project.

Qualcomm Incorporated, "SRS Enhancements for LTE-A," 3GPP TSG-RAN WG1 Meeting #60bis, R1-102341, Beijing, China, Apr. 12-16, 2010, 4 pgs., 3rd Generation Partnership Project.

ZTE: "Details of Initial Signal Design", 3GPP TSG RAN WG1 Meeting#82, R1-154321, Aug. 24-28, 2015, pp. 1-3.

\* cited by examiner

SOUNDING REFERENCE SIGNAL TRANSMISSION FOR ENHANCED CARRIER AGGREGATION

CROSS REFERENCES

The present Application for Patent claims priority to U.S. Provisional Patent Application No. 62/313,100 by Chen, et al., entitled "Sounding Reference Signal Transmission for Enhanced Carrier Aggregation," filed Mar. 24, 2016, assigned to the assignee hereof.

BACKGROUND

The following relates generally to wireless communication and more specifically to sounding reference signals (SRS) under asymmetric enhanced carrier aggregation (eCA).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may each be referred to as a user equipment (UE).

A wireless communication system may support multiple component carriers (CCs) in a carrier aggregation (CA) or eCA configuration. CCs may be configured for uplink (UL) and downlink (DL) communication between a base station and a UE. A UE may transmit reference signals (e.g., SRS) to indicate the quality of a frequency channel used for communication with a base station.

Wireless communication systems may only configure a portion of UL CCs that a UE is capable of supporting and may reserve SRS transmissions for uplink CCs that are available for CA. This may result in an inaccurate estimation of channel conditions for bands that do not have an UL CC configured, which may cause inefficient use of the channel and reduced throughput.

SUMMARY

A user equipment (UE) may indicate to a base station the number of uplink (UL) component carriers (CCs) that the UE capable of supporting. A base station may then configure the UE for operation with multiple CCs in a carrier aggregation (CA) configuration and an auxiliary UL configuration. The CA configuration may include CCs for UL data transmissions and the auxiliary UL configuration may include CCs for UL reference signal transmissions (e.g., sounding reference signal (SRS)) or random access channel (RACH) transmissions. The UE may thus transmit SRS or RACH messages on UL CCs that are otherwise not configured for the UE. UL data transmissions may be sent at the same time as SRS transmissions if the UE is capable of parallel UL transmission, or during different transmission time intervals (TTIs), if the UE is not capable of parallel UL transmission.

A method of wireless communication is described. The method may include transmitting an indication of a number of UL carriers that a UE is capable of supporting, receiving signaling that indicates a CA configuration and an auxiliary UL configuration, the CA configuration comprising one or more carriers configured for UL data transmissions and the auxiliary UL configuration comprising one or more carriers configured for UL reference signal transmissions and transmitting a SRS using the one or more carriers of the auxiliary UL configuration based on the CA configuration and the UE capability.

An apparatus for wireless communication is described. The apparatus may include means for transmitting an indication of a UE capability, means for receiving a CA configuration and an auxiliary UL configuration, the CA configuration comprising one or more carriers configured for UL data transmissions and the auxiliary UL configuration comprising one or more carriers configured for UL reference signal transmissions and means for transmitting a SRS using the one or more carriers of the auxiliary UL configuration based on the CA configuration and the UE capability.

A further apparatus is described. The apparatus may include a processor, memory in electronic communication with the processor, and instructions stored in the memory. The instructions may be operable to cause the processor to transmit an indication of a UE capability, receive a CA configuration and an auxiliary UL configuration, the CA configuration comprising one or more carriers configured for UL data transmissions and the auxiliary UL configuration comprising one or more carriers configured for UL reference signal transmissions and transmit a SRS using the one or more carriers of the auxiliary UL configuration based on the CA configuration and the UE capability.

A non-transitory computer readable medium for wireless communication is described. The non-transitory computer-readable medium may include instructions to cause a processor to transmit an indication of a UE capability, receive a CA configuration and an auxiliary UL configuration, the CA configuration comprising one or more carriers configured for UL data transmissions and the auxiliary UL configuration comprising one or more carriers configured for UL reference signal transmissions and transmit a SRS using the one or more carriers of the auxiliary UL configuration based on the CA configuration and the UE capability.

In some examples of the method, apparatus, or non-transitory computer-readable medium described herein, the CA configuration comprises a first number (e.g., quantity) of carriers configured for downlink (DL) transmission and a second number of carriers configured for UL transmission, and where the first number is greater than the second number. In some examples of the method, apparatus, or non-transitory computer-readable medium described herein, the auxiliary UL configuration comprises a third number of carriers, and where the third number is based on a difference between the first number and the second number.

Some examples of the method, apparatus, or non-transitory computer-readable medium described herein may further include processes, features, means, or instructions for transmitting an UL data transmission on the one or more carriers configured for UL data transmissions, where UL data is transmitted during a same TTI as the SRS.

In some examples of the method, apparatus, or non-transitory computer-readable medium described herein, the one or more carriers configured for UL data transmissions comprise at least one carrier configured for time division duplexing (TDD). Some examples of the method, apparatus, or non-transitory computer-readable medium described herein may further include processes, features, means, or instructions for transmitting an additional SRS, where the SRS is transmitted using a first set of antennas and the additional SRS is transmitted using a second set of antennas.

In some examples of the method, apparatus, or non-transitory computer-readable medium described herein, the first set of antennas is selected for transmissions on the one or more carriers used for the SRS and the second set of antennas is selected for transmissions on an additional carrier used for the additional SRS. In some examples, the SRS is a periodic SRS or an aperiodic SRS and the additional SRS is a periodic SRS or an aperiodic SRS, and the first set of antennas is selected based on the SRS being the periodic SRS and the second set of antennas is selected based on the additional SRS being the aperiodic SRS. Additionally or alternatively, some examples may include receiving radio resource control (RRC) signaling or downlink control information (DCI), and the first set of antennas or the second set of antennas may be selected based at least in part on the RRC signaling or the DCI.

Some examples of the method, apparatus, or non-transitory computer-readable medium described herein may further include processes, features, means, or instructions for identifying one or more switching symbols based on the transmitted SRS or a location of the SRS, or both and rate matching or puncturing an UL data transmission based on the one or more switching symbols. Some examples also include processes, features, means, or instructions for initiating the UL data transmission during a symbol period after the one or more switching symbols.

In some examples of the method, apparatus, or non-transitory computer-readable medium described herein, the one or more switching symbols are identified based on a location in a subframe of a symbol comprising the SRS relative to other symbols of the subframe. Some examples include processes, features, means, or instructions for transmitting an indication of a switching time (e.g., which may be included in the indication of the UE capability), where the one or more switching symbols are based on the switching time.

In some examples of the method, apparatus, or non-transitory computer-readable medium described herein, the one or more switching symbols are identified based on a symbol location of the SRS. In some examples, the one or more switching symbols are identified based on a combination of carriers used for the SRS and the UL data transmission.

Some examples of the method, apparatus, or non-transitory computer-readable medium described herein may further include processes, features, means, or instructions for transmitting a physical random access channel (PRACH) message on the one or more carriers of the auxiliary UL configuration. Some examples also include processes, features, means, or instructions for receiving a second auxiliary configuration for a second timing adjustment group (TAG), where the auxiliary UL configuration is associated with a first TAG.

In some examples of the method, apparatus, or non-transitory computer-readable medium described herein, the CA configuration comprises the auxiliary UL configuration. In some examples of the method, apparatus, or non-transitory computer-readable medium described herein, the auxiliary UL configuration is distinct from the CA configuration.

In some examples of the method, apparatus, or non-transitory computer-readable medium described herein, the CA configuration is part of a dual-connectivity configuration. In some examples, the CA configuration comprises a set of physical uplink control channel (PUCCH) groups, and where the auxiliary UL corresponds to one of the set of PUCCH groups.

In some examples of the method, apparatus, or non-transitory computer-readable medium described herein, the one or more carriers configured for UL data transmissions comprise carriers of a first TAG and the one or more carrier configured for UL reference signals comprise carriers of a second TAG.

Another method of wireless communication is described. The method may include receiving an indication of a UE capability, transmitting a CA configuration and an auxiliary UL configuration for the UE, the CA configuration comprising one or more carriers configured for UL data transmissions and the auxiliary UL configuration comprising one or more carriers configured for UL reference signal transmissions and receiving a SRS using the one or more carriers of the auxiliary UL configuration based on the CA configuration and the UE capability.

Another apparatus for wireless communication is also described. The apparatus may include means for receiving an indication of a UE capability, means for transmitting a CA configuration and an auxiliary UL configuration for the UE, the CA configuration comprising one or more carriers configured for UL data transmissions and the auxiliary UL configuration comprising one or more carriers configured for UL reference signal transmissions and means for receiving a SRS using the one or more carriers of the auxiliary UL configuration based on the CA configuration and the UE capability.

A further apparatus is described. The apparatus may include a processor, memory in electronic communication with the processor, and instructions stored in the memory. The instructions may be operable to cause the processor to receive an indication of a UE capability, transmit a CA configuration and an auxiliary UL configuration for the UE, the CA configuration comprising one or more carriers configured for UL data transmissions and the auxiliary UL configuration comprising one or more carriers configured for UL reference signal transmissions and receive a SRS using the one or more carriers of the auxiliary UL configuration based on the CA configuration and the UE capability.

Another non-transitory computer readable medium for wireless communication is described. The non-transitory computer-readable medium may include instructions to cause a processor to receive an indication of a UE capability, transmit a CA configuration and an auxiliary UL configuration for the UE, the CA configuration comprising one or more carriers configured for UL data transmissions and the auxiliary UL configuration comprising one or more carriers configured for UL reference signal transmissions and receive a SRS using the one or more carriers of the auxiliary UL configuration based on the CA configuration and the UE capability.

In some examples of the method, apparatus, or non-transitory computer-readable medium described herein, the CA configuration comprises a first number of carriers configured for DL transmission and a second number of carriers configured for UL transmission, and where the first number is greater than the second number.

Some examples of the method, apparatus, or non-transitory computer-readable medium described herein may further include processes, features, means, or instructions for receiving an UL data transmission on the one or more carriers configured for UL data transmissions, where the UL data is transmitted during a same TTI as the SRS.

Some examples of the method, apparatus, or non-transitory computer-readable medium described herein may further include processes, features, means, or instructions for identifying one or more switching symbols based on the SRS. Some examples of the method, apparatus, or non-transitory computer-readable medium described herein may further include processes, features, means, or instructions for receiving an UL data transmission during a symbol period after the one or more switching symbols.

Some examples of the method, apparatus, or non-transitory computer-readable medium described herein may further include processes, features, means, or instructions for receiving an indication of a switching time, where the one or more switching symbols are based on the switching time. Some examples of the method, apparatus, or non-transitory computer-readable medium described herein may further include processes, features, means, or instructions for receiving a PRACH message on the one or more carriers of the auxiliary UL configuration.

Some examples of the method, apparatus, or non-transitory computer-readable medium described herein may further include processes, features, means, or instructions for transmitting a second auxiliary configuration for a second TAG, where the auxiliary UL configuration is associated with a first TAG.

DETAILED DESCRIPTION

A user equipment (UE) may be configured with auxiliary uplink (UL) component carriers (CCs) for transmission of reference signals in addition to UL CCs configured for data transmission in a carrier aggregation (CA) configuration. Auxiliary UL CCs may be used for sounding reference signal (SRS) and physical random access channel (PRACH) transmissions, for example, without necessarily being utilized for uplink data transmissions (e.g., such as transmissions on physical uplink shared channel (PUSCH)). The UE may be configured with auxiliary CCs based on the ability of the UE to support communication on multiple CCs. For example, a UE may support parallel UL transmission on a number of different CCs, so the UE may be configured with CCs for UL data transmissions and UL reference signal transmissions.

Auxiliary CCs may be used in parallel (e.g., concurrently) with UL CCs in CA; or alternatively, they may be used during transmission time intervals (TTIs) when data is not being transmitted on an UL CC of the CA configuration. UEs that do not support parallel transmission may employ SRS antenna switching. For non-parallel auxiliary CC configuration (e.g., configuration of antenna switching parameters), a gap duration may be indicated to define a time duration of switching to and from UL CCs.

In some cases, a UE's transmission antennas may be split among different CCs for periodic or aperiodic SRS transmissions. In the case of dual-connectivity, SRS switching may apply to each group of the two groups configured for dual-connectivity. UEs not capable of parallel transmissions may be configured with UL CCs based on the UL CCs symbol availability. Signaling of a time duration or gap during which a UE switches from one CC to another may depend on a frequency band being utilized.

Aspects of the disclosure introduced above are described more fully below in the context of a wireless communication system. Examples of wireless communications systems that support use of auxiliary UL CCs to exploit a UE's capability to transmit on multiple CCs, including CCs additional to those configured of UL data, are described. Aspects of the disclosure are further illustrated by and described with reference to apparatus diagrams, system diagrams, and flowcharts that relate to SRS under asymmetric eCA.

Figure 1:
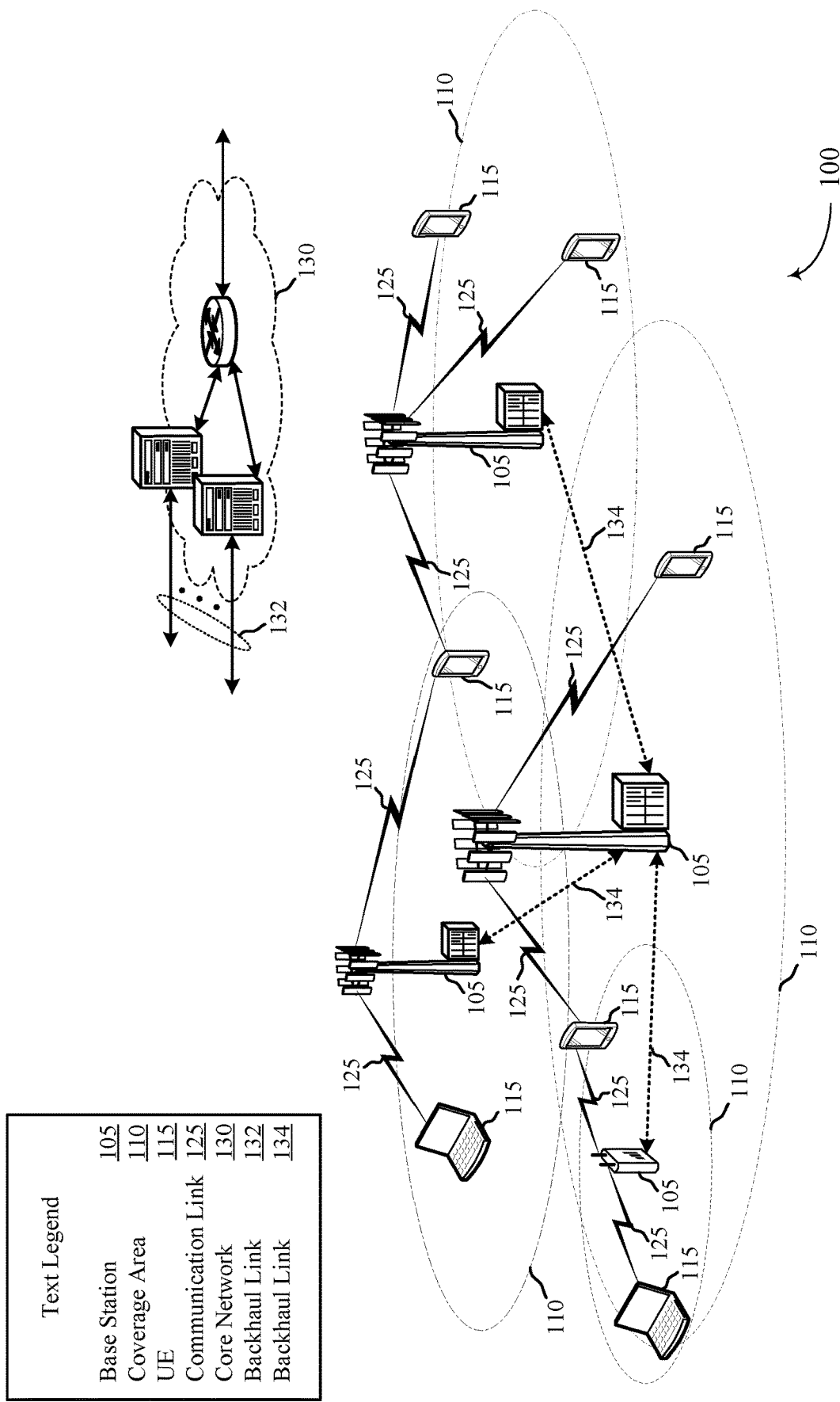
FIG. 1 illustrates an example of a wireless communications system that supports sounding reference signals (SRS) under asymmetric enhanced carrier aggregation (eCA) in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network.

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A UE 115 may be configured with a number of CCs (e.g., up to 32 CCs) for CA. The CCs of a CA may be associated with one or several base stations 105. Each CC may be backward compatible and span a different frequency gap (e.g., up to 20 MHz). Multiple CCs configured for a UE 115 may span a maximum frequency region (e.g., up to 640 MHz). CCs in CA may be all frequency division duplex (FDD), all time division duplex (TDD), or a mixture of FDD and TDD. Different TDD CCs may have the same or different UL/DL configurations. In some cases, special subframes may be configured differently for different TDD CCs. One CC may be configured as the UE's primary CC (e.g., PCell or PCC) and other CCs may be configured as secondary CCs (e.g., SCell or SCC). The PCell may carry a physical uplink control channel (PUCCH). Some CCs may be on a licensed spectrum, while some other CCs may be on an unlicensed spectrum or a shared spectrum.

In some examples, UEs 115 may be configured with a large number of CCs (e.g., 20 or more CCs). This type of configuration may be referred to as enhanced CA (eCA). The term eCA may also refer to CA configurations that are enhanced relative to earlier deployments of CA-aggregation schemes. For example, use of auxiliary UL CCs or dynamically switching between CCs for certain transmissions may be examples of eCA. The terms CA and eCA may thus be used interchangeably to describe features related to multi-carrier configurations. In some cases, eCA may refer to CA in enhanced systems.

In some cases, a UE 115 may be served by cells from two or more base stations 105 that are connected by a non-ideal backhaul link 134 in dual connectivity operation. For example, the connection between the serving base stations 105 may not be sufficient to facilitate precise timing coordination. Thus, in some cases, the cells serving a UE 115 may be divided into multiple TAGs. In another example, one or more CCs may be connected with a one or more repeaters, while other CCs may be operated without a repeater. As a result, in some cases, the cells or different CCs serving a UE 115 may be divided into multiple TAGs. Each TAG may be associated with a different timing offset, such that the UE 115 may synchronize UL transmissions differently for different UL carriers.

In dual-connectivity, cells may be partitioned into two groups, the primary cell group (PCG) and the secondary cell group (SCG). Each group may have one or more cells in CA and may use a single cell to carry PUCCH. So in some cases, a UE may be configured with a PCell and another CC may be configured as the primary secondary CC (e.g., PSCell). A PSCell may also carry PUCCH (e.g., for the SCG) but may not include all of the attributes of the PCell. UL control information may be separately conveyed to each group via the PUCCH in each group. An SCG may also support semi-persistent scheduling (SPS) and scheduling requests (SRs). A UE 115 may additionally monitor a common search space in SCG.

In some examples, wireless communications system 100 may utilize enhanced component carriers (eCCs). An eCC may be characterized by one or more features including: wider bandwidth, shorter symbol duration, shorter TTIs, and modified control channel configuration. An eCC may be associated with a CA configuration or a dual connectivity configuration. An eCC may also be configured for use in unlicensed spectrum or shared spectrum (e.g., where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may use a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 μs). A TTI in eCC may consist of one or multiple symbols. In some cases, the TTI duration (that is, the number of symbols in a TTI) may be variable.

Wireless communications system 100 may rely on SRS transmissions from UEs 115 for channel estimation and to facilitate communication between UEs 115 and base stations 105. An SRS may be transmitted by UE 115 using a predetermined sequence (e.g., a Zadoff-Chu sequence) so that a base station 105 may estimate the UL channel quality. An SRS transmission may not be associated with transmission of data on another channel, and may be transmitted periodically on a wide bandwidth (e.g., a bandwidth including more subcarriers than are allocated for UL data transmission). An SRS may also be scheduled on multiple antenna ports and may still be considered a single SRS transmission. An SRS transmission may be categorized as a Type 0 (periodically transmitted at equally spaced intervals) SRS or as a Type 1 (aperiodic) SRS. Thus, data gathered by a base station 105 from an SRS may be used to inform an UL scheduler. A base station 105 may also utilize an SRS to check timing alignment status and send time alignment commands to the UE 115-a.

Wireless communications system 100 may SRS transmission on various CCs configured for a UE 115. For example, a UE 115 may switch to and between CCs (e.g., TDD CCs) for SRS transmission depending on resource availability for the CCs. For instance, a UE 115 may be configured with several DL CCs and a smaller number of UL CCs. A UE 115 may thus have fewer CCs available for UL data transmissions (e.g., PUSCH) than are configured for DL communications (e.g., PDSCH). But resources of the unpaired UL CCs may nevertheless be available for use by UE 115 even if the UE 115 is not configured for UL data transmission on those CCs. Additional examples of SRS transmissions in such asymmetric CA configurations are described further below.

Figure 2:
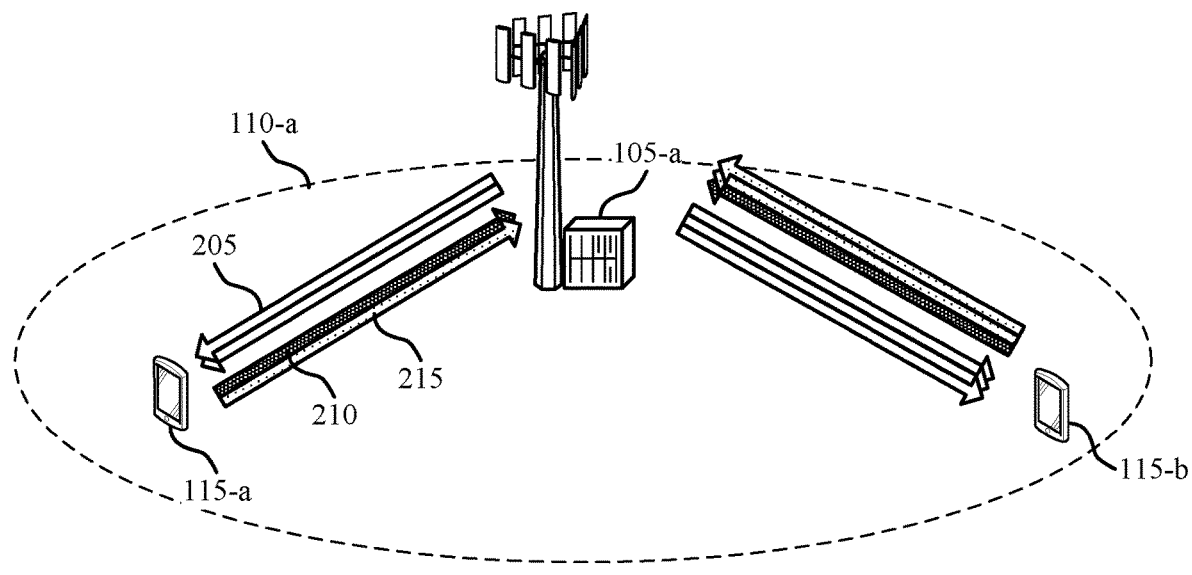
FIG. 2 illustrates an example of a wireless communications system that supports SRS under asymmetric eCA in accordance with aspects of the present disclosure.

FIG. 2 illustrates an example of a wireless communications system 200 for SRS under asymmetric eCA. Wireless communications system 200 may include base station 105-a and UE 115-a, which may be examples of the corresponding devices described with reference to FIG. 1. Wireless communications system 200 represents a system that supports configuration of auxiliary UL CCs 215 for transmission of SRS. Configuration of auxiliary UL CCs 215 may be based on a UE's CC support capabilities in CA.

In some cases, a CA configuration may include more DL CCs 205 than UL CCs 210. This may be known as an asymmetric CA configuration. For example, a UE 115 (e.g., UE 115-a) may not transmit SRS for channel estimation of DL CCs 205 that do not have corresponding UL CC. In such cases, the serving base station 105 (e.g., base station 105-a) may not be able to produce accurate channel estimates for all of the DL CCs 205. So base station 105-a may configure UE 115-a with a number of auxiliary UL CCs 215 for transmission of SRS (e.g., corresponding to the number of DL CCs 205 that are not associated with an UL CC 210 of the CA configuration). This may enable more accurate channel estimation for each CC in the CA configuration and may improve the efficiency of the wireless communications system 200.

UE 115-*a* may transmit SRS on available resources of UL CCs 215. For example, UL CCs 215 may include available resources (e.g., auxiliary CCs) that were not previously allocated or configured for UL data transmissions. In some cases, a UE 115 may transmit using auxiliary UL CCs 215 in parallel (e.g., concurrently) with other UL CCs in a CA configuration (e.g., CA UL CC 210). For example, UEs 115 that do not support parallel transmissions may transmit SRS on auxiliary UL CCs 215 with coordinated antenna switching, rate matching, or resource puncturing procedures. In some cases, UE 115 may transmit on auxiliary UL CC 215 and UL CC 210 at different times, and may indicate a time or gap associated with tuning between the carriers. For example, a gap duration may be indicated to define, for coordinated antenna switching with base station 105-*a*, a time duration of switching to and from UL CCs (e.g., time duration associated with switching between auxiliary UL CCs 215 and CA UL CCs 210).

Auxiliary UL CCs 215 may be configured and/or operated based on UL CC capability of a UE 115. Different UEs 115 may have different capabilities in UL CA. For example, UE 115-*a* may be capable of two UL CCs (e.g., and may be configured with one auxiliary UL CC 215 and one CA UL CC 210) and UE 115-*b* may be capable of using three UL CCs (e.g., configured with two auxiliary UL CCs 215 and one CA UL CC 210). In some cases, UE capability may depend on the frequency band. That is, a UE 115 may be capable of UL CA for certain bands, but not capable of UL CA with other bands. A UE 115 that supports a CA configuration with a certain number of UL CCs (e.g., N CCs) may be configured with fewer than that number of CCs (e.g., less than N CCs). For example, UE 115-*a* may be capable of using UL CCs 210 in a CA configuration, but it may be configured with one UL CC 210 for the CA configuration.

By way of example, UE 115-*b* may be configured with three DL CCs 205 and one UL CC 210 for CA, even though UE 115-*b* may be capable of supporting a CA configuration with three UL CCs 210. In some examples, a UE 115-*b* may be limited to parallel transmissions based on a total number of configured UL CCs. For example, UE 115-*b* may be configured with a CA configuration that includes two UL CC 210 and it may be configured with one auxiliary UL CC 215. In such cases, UE 115-*b* may be limited to concurrent transmission on two UL CCs during a single subframe. But in some cases, a UE 115-*b* may make parallel UL transmissions based on a total number of CCs UE 115-*b* supports. For example, UE 115-*b* may support a CA configuration with three UL CCs 210, and the UE 115-*b* may be configured with two UL CCs 210 and one auxiliary UL CC 215. In such cases, UE 115-*b* may concurrently transmit on both UL CCs 210 and the auxiliary UL CC 215 during a single subframe.

Additionally or alternatively, UE 115 may be configured with UL CCs (e.g., auxiliary UL CCs 215 and CA UL CCs 210) and may use the various configured CCs by switching antennas in a coordinated manner. That is, the SRS may be transmitted using a first antenna and a second antenna. SRS switching may be utilized in cases where an UL CC is not part of UL CA (e.g., for transmitting on auxiliary UL CC 215), which may facilitate DL multiple-input multiple-output (MIMO) operation. CCs used for UL data transmissions may also use the same antenna. If UE 115 is capable of using multiple transmission antennas, the transmission antennas may be split among different CCs. For example, antennas may be split for periodic or aperiodic SRS transmissions. For periodic SRS, the splitting of transmission antennas may be configured by radio resource control (RRC) and may further be tied with an SRS transmission counter. For aperiodic SRS, instead of RRC configuration, downlink control information (DCI) may further indicate antenna. As another example, the utilization of one or more antenna ports for transmission of SRS on a CC may be a function of a counter or an index associated with the SRS transmission, or some other parameters (e.g., a subframe index, an index of the CC, etc.). For instance, for odd number of transmissions, a first antenna port may be used for SRS, while for even number of transmissions, a second antenna port may be used for SRS.

For UEs 115 that are not capable of parallel transmissions for two or more CCs involved in switching, UL CCs may be configured based on the UL CCs symbol availability. Depending on the time required to switch from one CC to another CC, some symbols may be punctured or rate matched around to facilitate the switching (e.g., the first symbol of an UL subframe). For example, UE 115-*b* may switch from an auxiliary UL CC 215 (e.g., a CC configured for reference signal transmission) to a UL CC 210 (e.g., a CC configured for UL control and data transmissions). In such cases, in order to facilitate the switching, a first symbol of a subframe used for transmission on the UL CC 210 may not be available for UL transmissions (e.g., PUSCH or PUCCH). Alternatively, UE 115-*b* may switch from a UL CC 210 to an auxiliary UL CC 215. This type of switching scenario may not affect other transmissions. For example, in a subframe used for SRS transmission on an auxiliary UL CC 215, there may be no other transmission in at least the first several symbols of that subframe. So there may be little or, no impact on the auxiliary UL CC 215.

The UE capability may affect the extent to which symbols used for other transmissions may be affected by switching between CCs. If a UE 115 is capable of fast switching, the UE 115 may switch between CCs without affecting other transmissions and so there may be no symbol designated for switching. Further, SRS symbol location may affect the extent to which transmission in other symbols may be impacted. For example, if an SRS is not located in the last symbol or the last set of symbols of a subframe, other symbols may not be affected due to a UE 115 switching between CCs, and so it may be unnecessary for wireless communications system 200 to facilitate switching impacts on specific symbols.

In some cases, a UE 115 may indicate certain requirements or preferences for scheduling to accommodate switching. For example, a UE 115 may signal a time duration or gap during which a UE 115 needs or preferably has to switch from one CC to another. The gap may depend on the frequency bands of the CCs between which the UE 115 is switching. By way of example, for inter-band switching, a UE 115 may signal for a certain band combination whether a short or long gap is used for switching (e.g., one bit per band or one bit per band combination). Additionally or alternatively, for intra-band switching, signaling may include one bit to indicate a long or a short gap for switching within the band. In some examples, an additional bit, which may be called a "learning capability bit," may further be used. For instance, if a UE 115 is capable, a long gap may be utilized for a certain band or within a band, after which a short gap may then be used for switching; and the UE 115 may indicate this capability to base station 105 using the "learning capability bit."

Wireless communications system 200 may also support PRACH transmission on auxiliary UL CCs 215 (e.g., in order to obtain UL timing for auxiliary UL CCs 215). Instead of contention based PRACH, non-contention based PRACH may be supported and may be triggered via downlink control information from a PCell or a PSCell. For example, wireless communications system 200 may support PRACH on auxiliary UL CCs 215, particularly when the UE 115 is configured with two or more timing advance groups (TAGs). Auxiliary UL CCs 215 and UL CCs 210 of a CA configuration may be associated with different TAGs; in which case, different UL timing for auxiliary UL CCs 215 may be used. In such cases, different UL timing may allow SRS transmissions to be orthogonal to UL transmissions from other UEs 115 on the same CC.

In other examples, such as those employing dual-connectivity, switching for SRS transmissions may apply to each group of carriers configured for dual-connectivity. The configuration of one or more auxiliary UL CCs 215 may be separately configured for each group. For example, a PCG may have no auxiliary UL CC 215 configured, while an SCG may be configured with one auxiliary UL CC 215. A similar scheme may be employed in CA if two PUCCH groups are configured.

Figure 3:
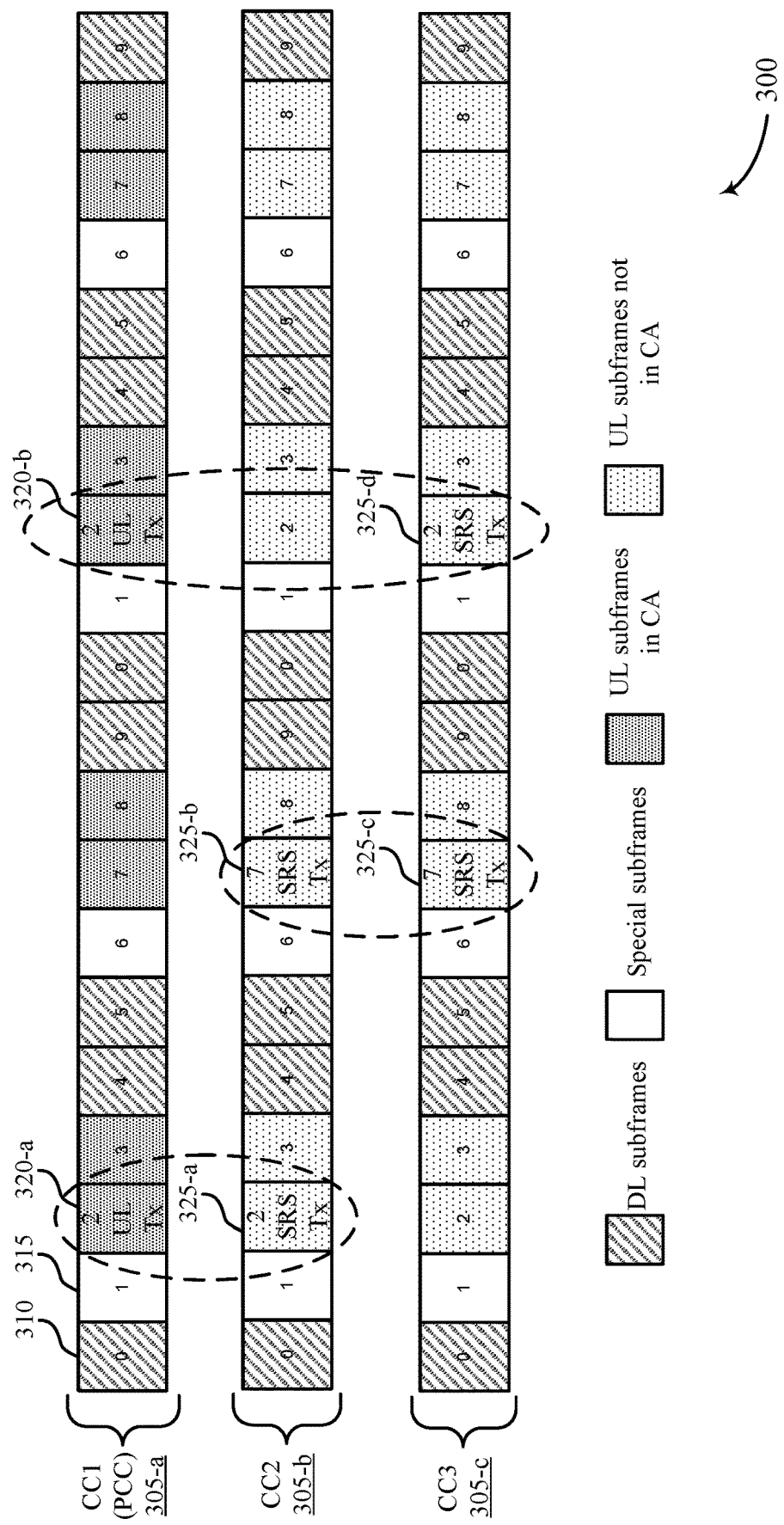
FIG. 3 illustrates an example of an auxiliary component carrier (CC) configuration that supports SRS under asymmetric eCA in accordance with aspects of the present disclosure.

FIG. 3 illustrates an example of an auxiliary CC configuration 300 for SRS under asymmetric eCA. In some cases, auxiliary CC configuration 300 may represent aspects of techniques performed by a UE 115 or base station 105 as described with reference to FIGS. 1-2.

CCs (e.g., CC1, CC2, and CC3) may have subframe configurations 305. Subframe configurations 305 may include DL subframes 310, special subframes 315, CA UL subframes 320, and/or non-CA UL subframes 325. CC1 may be configured to be a PCC and CC1-CC3 may have the same or different subframe configurations 305 that include different configurations of the aforementioned subframes.

DL subframes 310 may be used for downlink communications from a base station 105 to a UE 115. DL subframes 310 may include PDSCH or DCI. DL subframes 310 may be followed by a special subframe 315, which, in the example of FIG. 3, is then followed by UL subframes (e.g., CA UL subframes 320 and/or non-CA UL subframes 325).

Overlapping subframes in subframe configurations of different CCs (e.g., subframe 2 of subframe configuration 305-a and subframe configuration 305-b) may be used to transmit UL data and/or SRS. Thus, Instead of limiting a UE 115 to a single UL CC transmission in a subframe, multiple UL transmission may be allowed during the subframe (e.g., on CC1 and CC2, CC1 and CC3, or CC2 and CC3).

A UE configured for CC1-CC3 may thus support parallel transmission, in which case multiple CCs may be used for transmissions at the same time (e.g., during the same subframe). That is, CC1 (e.g., the PCC) may be used to transmit UL data on symbol 2 of subframe configuration 305-a at the same time CC2 may be used to transmit SRS on symbol 2 of subframe configuration 305-b.

CC1 may be used to transmit data during UL subframe 320-a, which may contain data, in parallel with UL subframe 325-a on CC2, which may be an auxiliary UL CC. The UL subframe 325-a may be configured to send SRS or PRACH, but may not be configured to send data. Alternatively, CC1 may be used to transmit during UL subframe 320-b, which may contain data, in parallel with UL subframe 325-d on CC3, which may be used for SRS. The UL subframe 325-d may be configured to send SRS or PRACH, but may not be configured to send data.

In some cases, both CC2 and CC3 may be used to transmit SRS or PRACH, or both (e.g., in parallel). That is, UL subframe 325-b of subframe configuration 305-b (e.g., CC2 subframe configuration) may be used to transmit in parallel with transmissions during UL subframe 325-c of subframe configuration 305-c (e.g., CC3 subframe configuration). SRS may be transmitted in UL subframes 325 SRS or PRACH, for instance.

Figure 4:
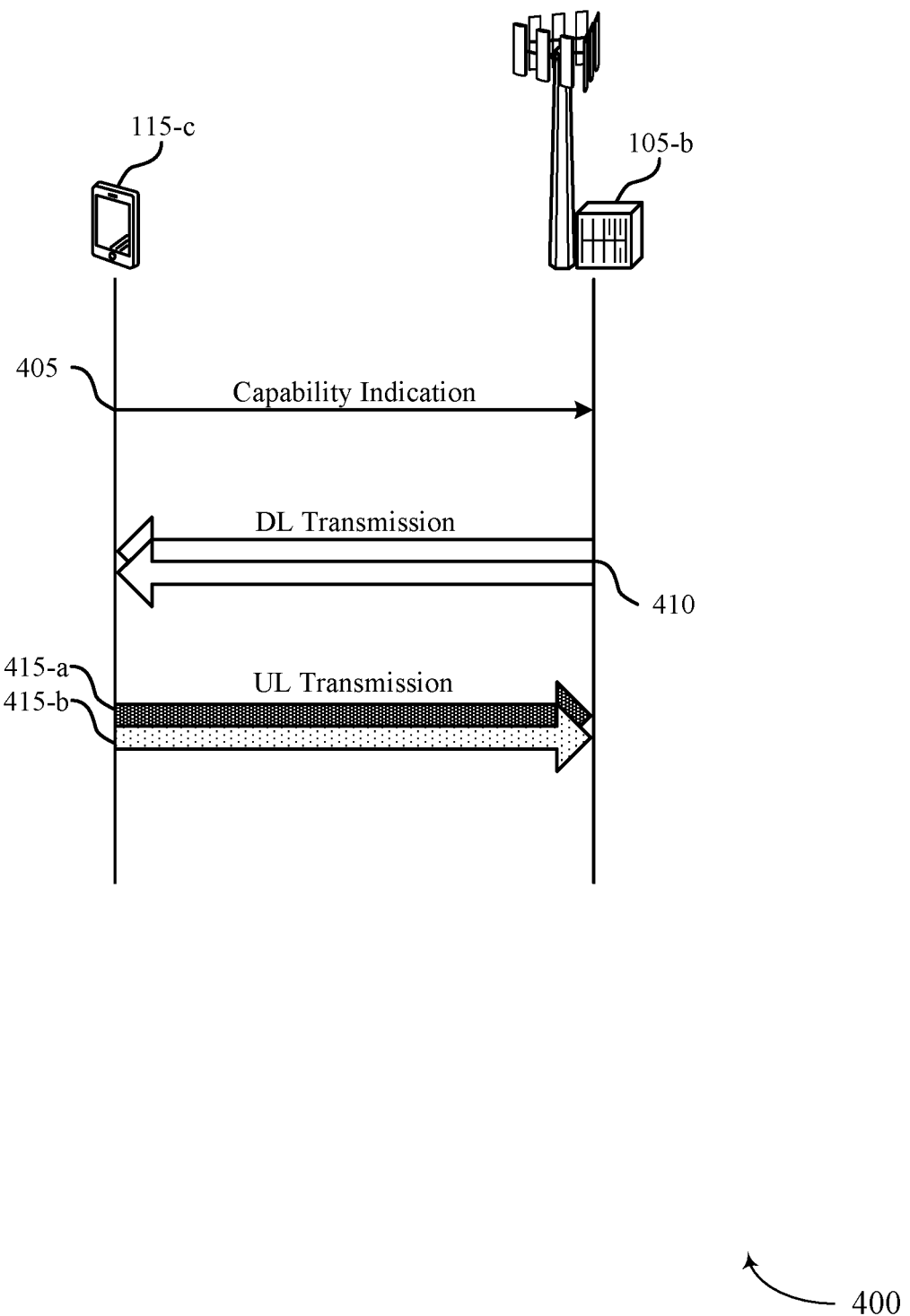
FIG. 4 illustrates an example of a process flow in a system that supports SRS under asymmetric eCA in accordance with aspects of the present disclosure.

FIG. 4 illustrates an example of a process flow 400 for SRS under asymmetric eCA in accordance with various aspects of the present disclosure. Process flow 400 may include base station 105-a and UE 115-a, which may be examples of the corresponding devices described with reference to FIG. 1-2.

At step 405, UE 115-c may transmit a capabilities indication to base station 105—(e.g., a number of UL CCs (e.g., carriers) that UE 115-c is capable of supporting, antenna switching capabilities, etc.). For example, a number of UL CCs supported may indicate the number of parallel UL transmissions UE 115-c is capable of supporting (e.g., a number of concurrent transmission that UE 115-c can make on different CCs).

At step 410, base station 105-b may signal a CA configuration and an auxiliary UL configuration to UE 115-c. The CA configuration may include CCs configured for UL data transmissions and the auxiliary UL configuration may include CCs configured for UL reference signal transmissions (e.g., SRS, PRACH, etc.). Further, the CA configuration may include carriers for DL transmissions in addition to carriers configured for UL transmission. The number of carriers configured for DL transmission may be greater than the number of carriers configured for UL transmission. The auxiliary UL configuration may be based on the CA configuration and the indication from step 405. In some cases, the CA configuration may include the auxiliary UL configuration. In other cases, the CA configuration may be separate from the auxiliary UL configuration.

At step 415-a, UE 115-c may transmit and the base station 105-b may receive UL data on UL CCs in CA.

At step 415-b, UE 115-c may transmit and base station 105-b may receive an SRS using the CCs of the auxiliary UL configuration signaled to the UE 115-c in step 410. The SRS may be periodic or aperiodic. Transmitting antennas may be selected based on the SRS being periodic or aperiodic. Alternatively, UE 115-c may transmit and base station 105-b may receive a PRACH message at step 415-b using the CCs of the auxiliary UL configuration.

Step 415-a and 415-b may be performed during a same TTI (e.g., parallel CC transmission). Alternatively, a UE may switch between carriers to perform step 415-a and step 415-b (e.g., antenna switching for single CC transmission).

Figure 5:
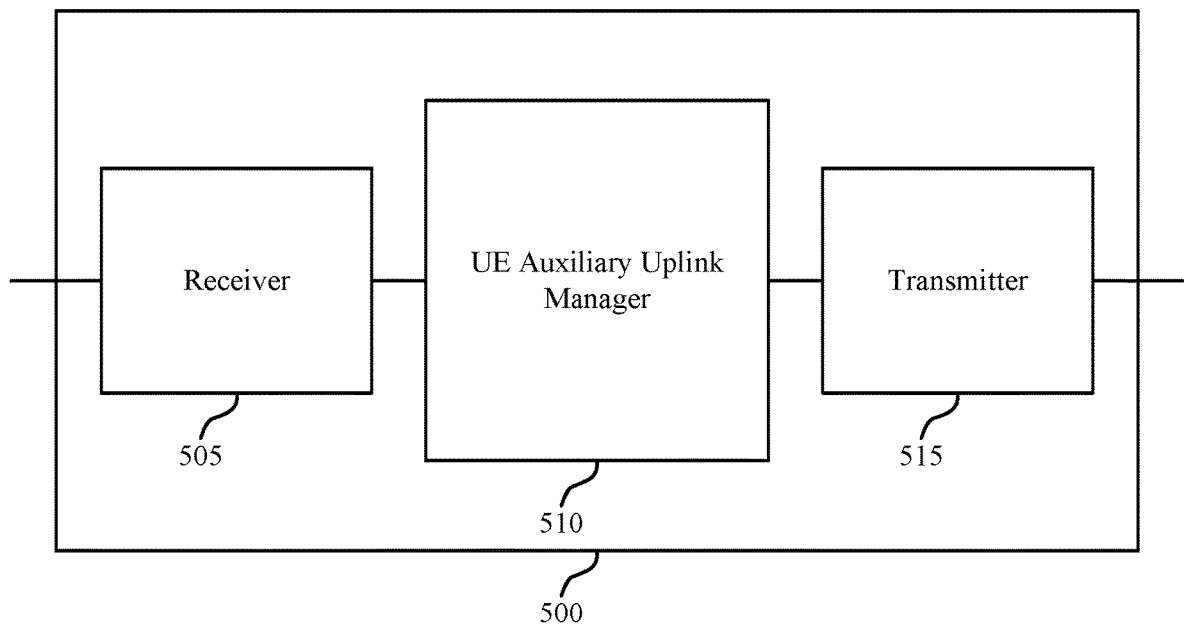
FIGS. 5 through 7 show block diagrams of a wireless device that supports SRS under asymmetric eCA in accordance with aspects of the present disclosure.

FIG. 5 shows a block diagram of a wireless device 500 that supports SRS under asymmetric eCA in accordance with various aspects of the present disclosure. Wireless device 500 may be an example of aspects of a UE 115 described with reference to FIGS. 1 and 2. Wireless device 500 may include receiver 505, UE auxiliary uplink manager 510 and transmitter 515. Wireless device 500 may also include a processor. Each of these components may be in communication with each other.

The receiver 505 may receive information such as packets, user data, or control information associated with various information channels (e.g., control channels, data channels, and information related to SRS under asymmetric eCA, etc.). Information may be passed on to other components of the device. The receiver 505 may be an example of aspects of the transceiver 825 described with reference to FIG. 8.

The UE auxiliary uplink manager 510 may, in combination with transmitter 515, transmit an indication of a UE capability. The UE auxiliary uplink manager, in combination with receiver 505, may receive a CA configuration and an auxiliary UL configuration. The CA configuration may include one or more carriers configured for UL data transmissions and the auxiliary UL configuration including one or more carriers configured for UL reference signal transmissions. The UE auxiliary uplink manager 510, in combination with transmitter 515, may transmit an SRS using the one or more carriers of the auxiliary UL configuration based on the CA configuration and the UE capability. The UE auxiliary uplink manager 510 may also be an example of aspects of the UE auxiliary uplink manager 805 described with reference to FIG. 8.

The transmitter 515 may transmit signals received from other components of wireless device 500. In some examples, the transmitter 515 may be collocated with a receiver in a transceiver module. For example, the transmitter 515 may be an example of aspects of the transceiver 825 described with reference to FIG. 8. The transmitter 515 may include a single antenna, or it may include a plurality of antennas.

Figure 6:
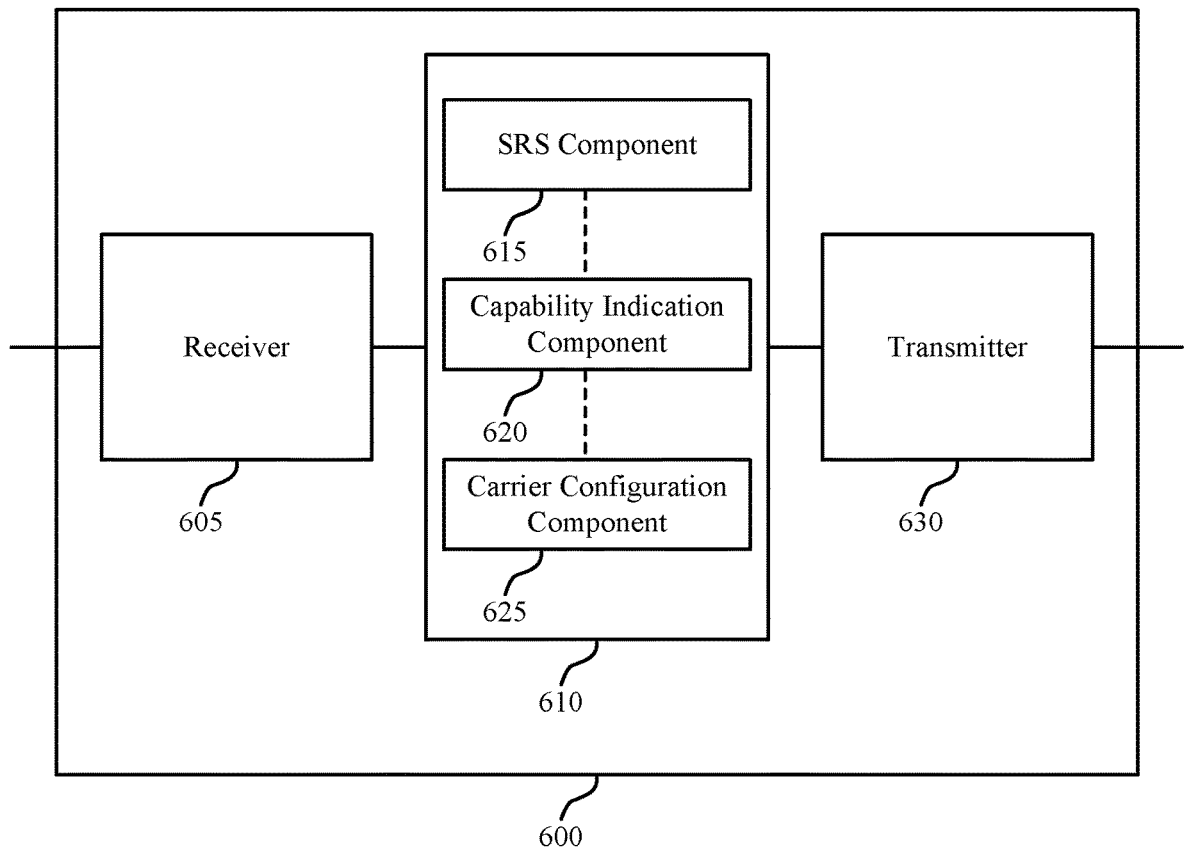

FIG. 6 shows a block diagram of a wireless device 600 that supports SRS under asymmetric eCA in accordance with various aspects of the present disclosure. Wireless device 600 may be an example of aspects of a wireless device 500 or a UE 115 described with reference to FIGS. 1, 2 and 5. Wireless device 600 may include receiver 605, UE auxiliary uplink manager 610 and transmitter 630. Wireless device 600 may also include a processor. Each of these components may be in communication with each other.

The receiver 605 may receive information which may be passed on to other components of the device. The receiver 605 may also perform the functions described with reference to the receiver 505 of FIG. 5. The receiver 605 may be an example of aspects of the transceiver 825 described with reference to FIG. 8.

The UE auxiliary uplink manager 610 may be an example of aspects of UE auxiliary uplink manager 510 described with reference to FIG. 5. The UE auxiliary uplink manager 610 may include SRS component 615, capability indication component 620 and carrier configuration component 625. The UE auxiliary uplink manager 610 may be an example of aspects of the UE auxiliary uplink manager 805 described with reference to FIG. 8.

The SRS component 615 may, in combination with transmitter 630, transmit an additional SRS, where the SRS is transmitted using a first set of antennas and the additional SRS is transmitted using a second set of antennas. The SRS component 615 may, in combination with transmitter 630, transmit an SRS using the one or more carriers of the auxiliary UL configuration based on the CA configuration and the UE capability. In some cases, the wireless device 600 may select a first set of antennas for transmissions on the one or more carriers used for the SRS and may select a second set of antennas for transmissions on an additional carrier used for the additional SRS. In some cases, the SRS is a periodic SRS or an aperiodic SRS and the additional SRS is a periodic SRS or an aperiodic SRS; the first set of antennas may be selected based on the SRS being the periodic SRS and the second set of antennas is selected based on the additional SRS being the aperiodic SRS. In some cases, the selection of antennas may be based on an RRC configuration for periodic SRS and determined from DCI in case of aperiodic SRS, for example.

The capability indication component 620 may, in combination with transmitter 630, transmit an indication of a number of UL carriers that a UE (e.g., wireless device 600) is capable of supporting. The carrier configuration component 625 may, in combination with receiver 605, receive a second auxiliary configuration for a second TAG, where the auxiliary UL configuration is associated with a first TAG; and carrier configuration component 625 may, in combination with receiver 605, receive a CA configuration and an auxiliary UL configuration. The CA configuration may include one or more carriers configured for UL data transmissions and the auxiliary UL configuration including one or more carriers configured for UL reference signal transmissions. In some cases, the auxiliary UL configuration includes a third number (e.g., quantity) of carriers, and the third number may be based on a difference between the first number and the second number.

In some cases, the one or more carriers configured for UL data transmissions include at least one carrier configured for TDD. In some cases, the one or more carriers configured for UL data transmissions include carriers of a first TAG and the one or more carrier configured for UL reference signals include carriers of a second TAG. In some cases, the CA configuration includes the auxiliary UL configuration. In some cases, the auxiliary UL configuration is distinct from the CA configuration. In some cases, the CA configuration is part of a dual-connectivity configuration. In some cases, the CA configuration includes a set of PUCCH groups, and where the auxiliary UL corresponds to one of the set of PUCCH groups. In some cases, the CA configuration includes a first number of carriers configured for DL transmission and a second number of carriers configured for UL transmission, and where the first number is greater than the second number.

The transmitter 630 may transmit signals received from other components of wireless device 600. In some examples, the transmitter 630 may be collocated with a receiver in a transceiver module. For example, the transmitter 630 may be an example of aspects of the transceiver 825 described with reference to FIG. 8. The transmitter 630 may utilize a single antenna, or it may utilize a plurality of antennas.

Figure 7:
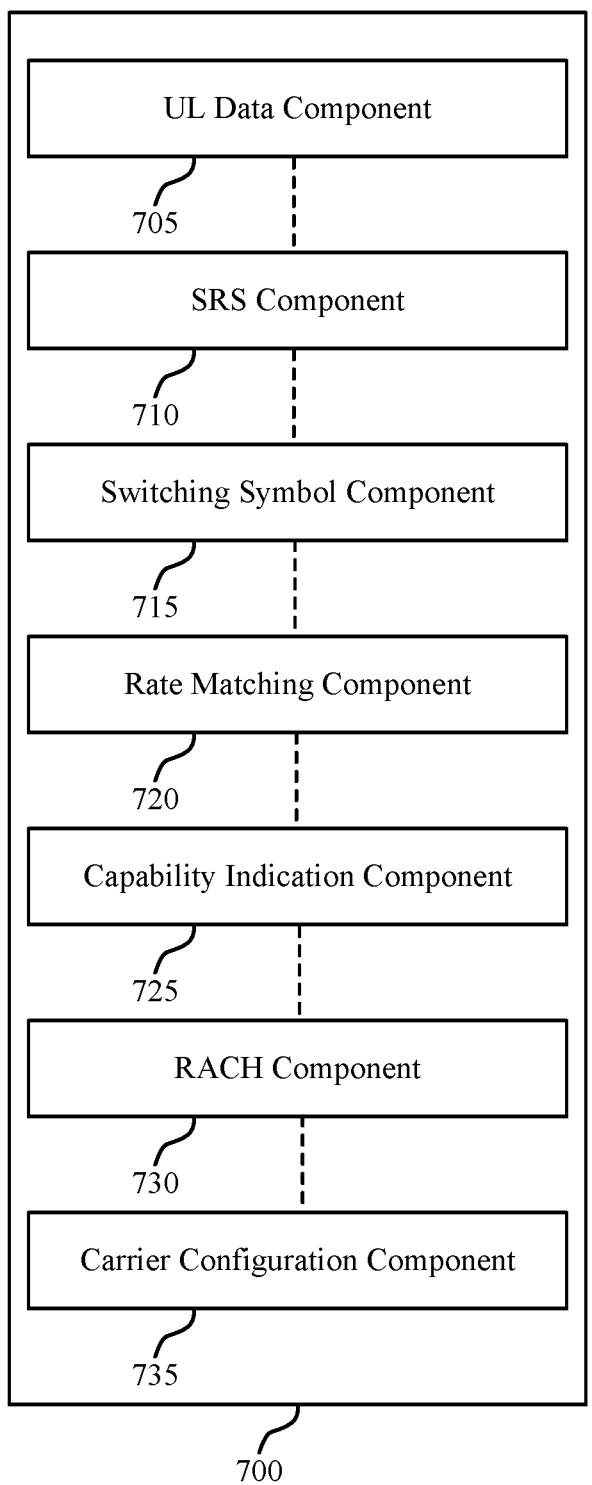

FIG. 7 shows a block diagram of a UE auxiliary uplink manager 700 which may be an example of the corresponding component of wireless device 500 or wireless device 600. That is, UE auxiliary uplink manager 700 may be an example of aspects of UE auxiliary uplink manager 510 or UE auxiliary uplink manager 610 described with reference to FIGS. 5 and 6. The UE auxiliary uplink manager 700 may also be an example of aspects of the UE auxiliary uplink manager 805 described with reference to FIG. 8.

The UE auxiliary uplink manager 700 may include UL data component 705, SRS component 710, switching symbol component 715, rate matching component 720, capability indication component 725, RACH component 730 and carrier configuration component 735. Each of these modules may communicate, directly or indirectly, with one another (e.g., via one or more buses).

The UL data component 705 may, in combination with, e.g., transmitter 515 or 630, transmit an UL data transmission on the one or more carriers configured for UL data transmissions, where UL data is transmitted during a same TTI as the SRS, and initiate the UL data transmission during a symbol period after the one or more switching symbols.

The SRS component 710 may, in combination with, e.g., transmitter 515 or 630, transmit an additional SRS; the SRS may be transmitted using a first set of antennas and the additional SRS is transmitted using a second set of antennas.

SRS component may also transmit an SRS using the one or more carriers of the auxiliary UL configuration based on the CA configuration and the UE capability.

The switching symbol component 715 may identify one or more switching symbols based on the transmitted SRS or a location of the SRS, or both. Transmitter 515 or 630 may thus transmit an indication of a switching time (e.g., which may be included in the indication of the UE capability) and the one or more switching symbols may be based on the switching time. In some cases, the one or more switching symbols are identified based on a location in a subframe of a symbol including the SRS relative to other symbols of the subframe. In some cases, the one or more switching symbols are identified based on a symbol location of the SRS. In some cases, the one or more switching symbols are identified based on a combination of carriers used for the SRS and the UL data transmission. In some cases, signaling from the UE 115 may be used to indicate the combination of carriers (e.g., a UE 115 may request a gap for a measurement configuration based on its radio capabilities, etc.).

In some examples, a switching symbol may be identified based on UE capability and can be signaled to the network. In some cases, a switching symbol may not be used in the case of switching from an UL data transmission to an SRS transmission due to the location of SRS in the latter symbols of a subframe.

The rate matching component 720 may rate match or puncture an UL data transmission based on the one or more switching symbols. The capability indication component 725 may, in combination with, e.g., transmitter 515 or 630, transmit an indication of a UE capability. The RACH component 730 may transmit a PRACH message on the one or more carriers of the auxiliary UL configuration.

The carrier configuration component 735 may receive a second auxiliary configuration for a second TAG; the auxiliary UL configuration may be associated with a first TAG, and receive a CA configuration and an auxiliary UL configuration. In some cases, the carrier configuration component 735 may receive a TAG configuration in which an SRS CC and the UL CC belong to different TAGs or PUCCH groups.

Figure 8:
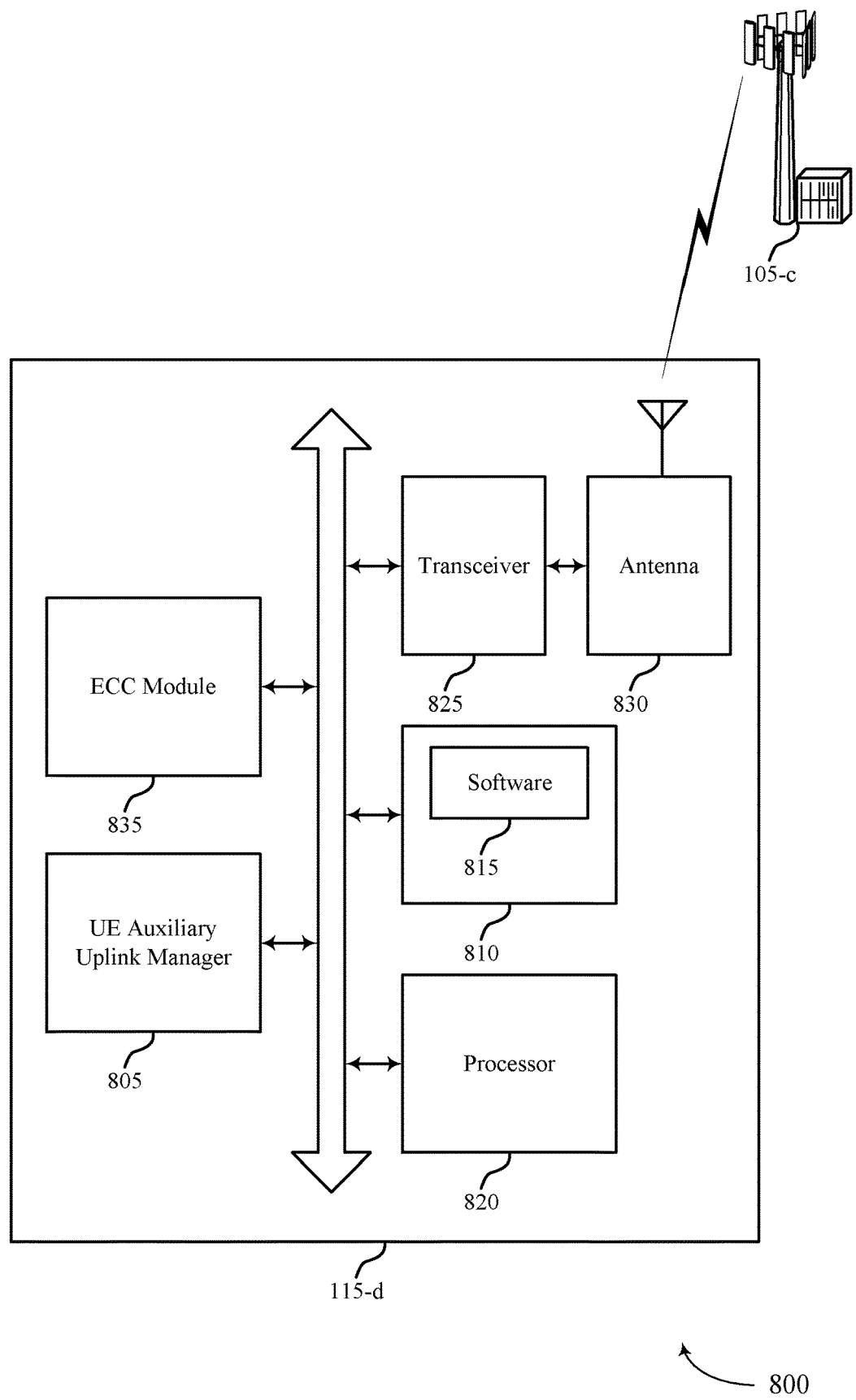
FIG. 8 illustrates a block diagram of a system including a UE that supports SRS under asymmetric eCA in accordance with aspects of the present disclosure.

FIG. 8 shows a diagram of a system 800 including a device that supports SRS under asymmetric eCA in accordance with various aspects of the present disclosure. For example, system 800 may include UE 115-*d*, which may be an example of a wireless device 500, a wireless device 600, or a UE 115 as described with reference to FIGS. 1, 2 and 5 through 7.

UE 115-*d* may also include UE auxiliary uplink manager 805, memory 810, processor 820, transceiver 825, antenna 830 and ECC module 835. Each of these modules may communicate, directly or indirectly, with one another (e.g., via one or more buses). The UE auxiliary uplink manager 805 may be an example of a UE auxiliary uplink manager as described with reference to FIGS. 5 through 7.

The memory 810 may include random access memory (RAM) and read only memory (ROM). The memory 810 may store computer-readable, computer-executable software including instructions that, when executed, cause the processor to perform various functions described herein (e.g., SRS under asymmetric eCA, etc.). In some cases, the software 815 may not be directly executable by the processor but may cause a computer (e.g., when compiled and executed) to perform functions described herein. The processor 820 may include an intelligent hardware device, (e.g., a central processing unit (CPU), a microcontroller, an application specific integrated circuit (ASIC), etc.)

The transceiver 825 may communicate bi-directionally, via one or more antennas, wired, or wireless links, with one or more networks, as described herein. For example, the transceiver 825 may communicate bi-directionally with a base station 105 or a UE 115. The transceiver 825 may also include a modem to modulate the packets and provide the modulated packets to the antennas for transmission, and to demodulate packets received from the antennas. In some cases, the wireless device may include a single antenna 830. However, in some cases the device may have more than one antenna 830, which may be capable of concurrently transmitting or receiving multiple wireless transmissions.

ECC module 835 may enable operations using eCCs such as communication using shared or unlicensed spectrum, using reduced TTIs or subframe durations, or using a large number of component carriers.

Figure 9:
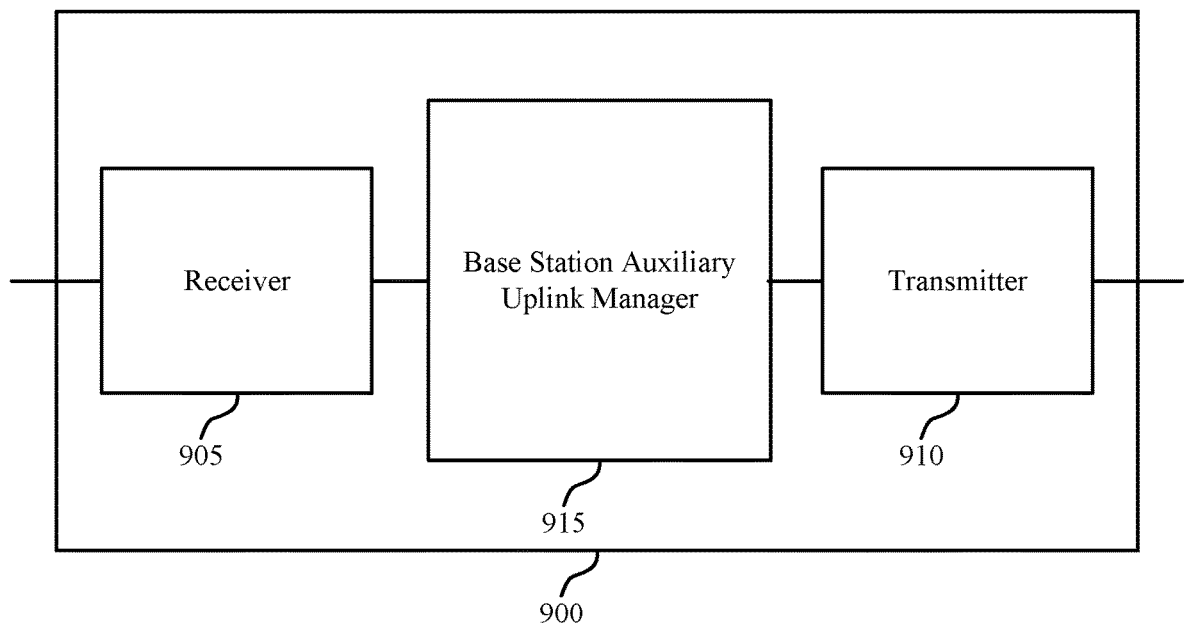
FIGS. 9 through 11 show block diagrams of a wireless device that supports SRS under asymmetric eCA in accordance with aspects of the present disclosure.

FIG. 9 shows a block diagram of a wireless device 900 that supports SRS under asymmetric eCA in accordance with various aspects of the present disclosure. Wireless device 900 may be an example of aspects of a base station 105 described with reference to FIGS. 1 and 2. Wireless device 900 may include receiver 905, transmitter 910 and base station auxiliary uplink manager 915. Wireless device 900 may also include a processor. Each of these components may be in communication with each other.

The receiver 905 may receive information such as packets, user data, or control information associated with various information channels (e.g., control channels, data channels, and information related to SRS under asymmetric eCA, etc.). Information may be passed on to other components of the device. The receiver 905 may be an example of aspects of the transceiver 1225 described with reference to FIG. 12.

The transmitter 910 may transmit signals received from other components of wireless device 900. In some examples, the transmitter 910 may be collocated with a receiver in a transceiver module. For example, the transmitter 910 may be an example of aspects of the transceiver 1225 described with reference to FIG. 12. The transmitter 910 may include a single antenna, or it may include a plurality of antennas.

The base station auxiliary uplink manager 915 may, in combination with receiver 905, receive an indication of a UE capability, transmit, in combination with transmitter 910, a CA configuration and an auxiliary UL configuration for the UE; the CA configuration may include one or more carriers configured for UL data transmissions and the auxiliary UL configuration including one or more carriers configured for UL reference signal transmissions. The base station auxiliary uplink manager 915 may, in combination with receiver 905, receive an SRS using the one or more carriers of the auxiliary UL configuration based on the CA configuration and the UE capability. The base station auxiliary uplink manager 915 may also be an example of aspects of the base station auxiliary uplink manager 1205 described with reference to FIG. 12.

Figure 10:
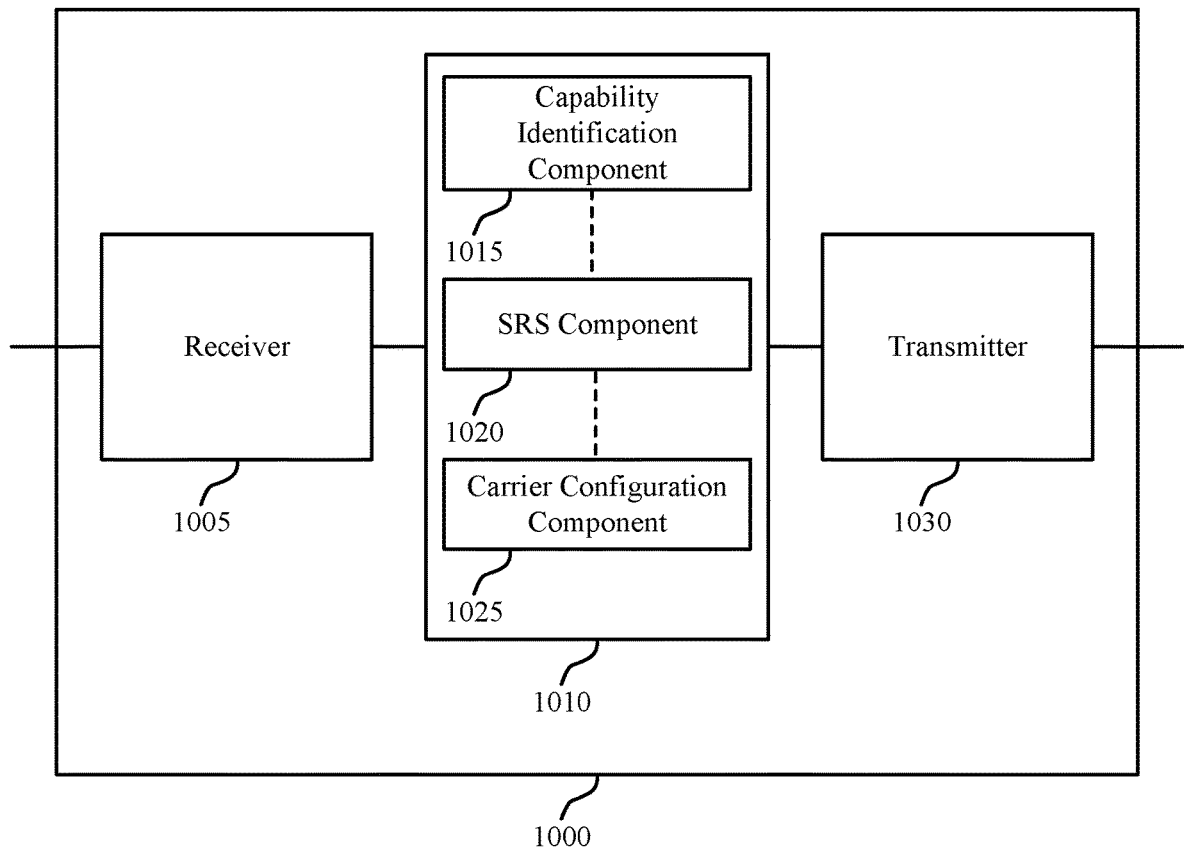

FIG. 10 shows a block diagram of a wireless device 1000 that supports SRS under asymmetric eCA in accordance with various aspects of the present disclosure. Wireless device 1000 may be an example of aspects of a wireless device 900 or a base station 105 described with reference to FIGS. 1, 2 and 9. Wireless device 1000 may include receiver 1005, base station auxiliary uplink manager 1010 and transmitter 1030. Wireless device 1000 may also include a processor. Each of these components may be in communication with each other.

The receiver 1005 may receive information which may be passed on to other components of the device. The receiver 1005 may also perform the functions described with reference to the receiver 905 of FIG. 9. The receiver 1005 may be an example of aspects of the transceiver 1225 described with reference to FIG. 12.

The base station auxiliary uplink manager 1010 may be an example of aspects of base station auxiliary uplink manager 915 described with reference to FIG. 9. The base station auxiliary uplink manager 1010 may include capability identification component 1015, SRS component 1020 and carrier configuration component 1025. The base station auxiliary uplink manager 1010 may be an example of aspects of the base station auxiliary uplink manager 1205 described with reference to FIG. 12.

The capability identification component 1015 may, in combination with receiver 1005, receive an indication of a UE capability. The SRS component 1020 may, in combination with receiver 1005, receive a SRS using the one or more carriers of the auxiliary UL configuration based on the CA configuration and the UE capability.

The carrier configuration component 1025 may, in combination with transmitter 1030, transmit a CA configuration and an auxiliary UL configuration for the UE; the CA configuration may include one or more carriers configured for UL data transmissions and the auxiliary UL configuration including one or more carriers configured for UL reference signal transmissions. The carrier configuration component 1025 may, in combination with transmitter 1030, transmit a second auxiliary configuration for a second TAG, where the auxiliary UL configuration may be associated with a first TAG. In some cases, the CA configuration includes a first number of carriers configured for DL transmission and a second number of carriers configured for UL transmission, and where the first number is greater than the second number.

The transmitter 1030 may transmit signals received from other components of wireless device 1000. In some examples, the transmitter 1030 may be collocated with a receiver in a transceiver module. For example, the transmitter 1030 may be an example of aspects of the transceiver 1225 described with reference to FIG. 12. The transmitter 1030 may utilize a single antenna, or it may utilize a plurality of antennas.

Figure 11:
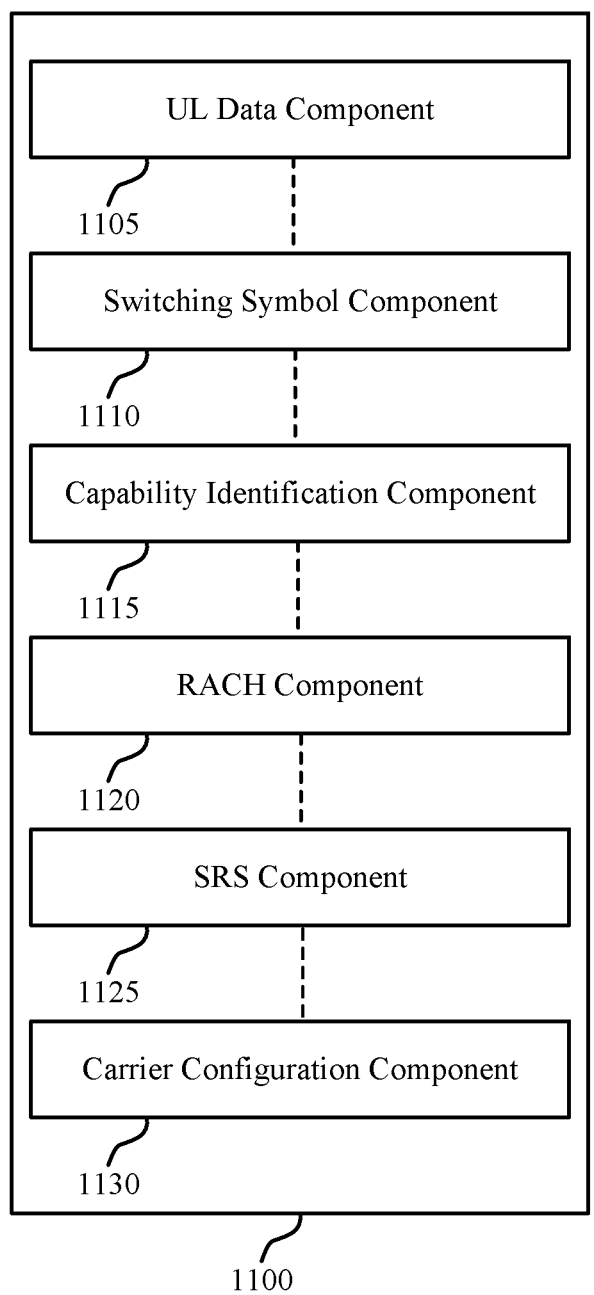

FIG. 11 shows a block diagram of a base station auxiliary uplink manager 1100 which may be an example of the corresponding component of wireless device 900 or wireless device 1000. That is, base station auxiliary uplink manager 1100 may be an example of aspects of base station auxiliary uplink manager 915 or base station auxiliary uplink manager 1010 described with reference to FIGS. 9 and 10. The base station auxiliary uplink manager 1100 may also be an example of aspects of the base station auxiliary uplink manager 1205 described with reference to FIG. 12.

The base station auxiliary uplink manager 1100 may include UL data component 1105, switching symbol component 1110, capability identification component 1115, RACH component 1120, SRS component 1125 and carrier configuration component 1130. Each of these modules may communicate, directly or indirectly, with one another (e.g., via one or more buses).

The UL data component 1105 may, in combination with receiver 905 or 1005, receive an UL data transmission on the one or more carriers configured for UL data transmissions, where the UL data may be transmitted during a same TTI as the SRS; and UL data component 1105 may receive an UL data transmission during a symbol period after the one or more switching symbols. The switching symbol component 1110 may identify one or more switching symbols based on the SRS, and receiver 905 or 1005 may receive an indication of a switching time; the one or more switching symbols may be based on the switching time.

The capability identification component 1115 may, in combination with receiver 905 or 1005, receive an indication of a UE capability. The RACH component 1120 may, in combination with receiver 905 or 1005, receive a PRACH message on the one or more carriers of the auxiliary UL configuration. The SRS component 1125 may, in combination with receiver 905 or 1005, receive a SRS using the one or more carriers of the auxiliary UL configuration based on the CA configuration and the UE capability.

The carrier configuration component 1130 may, in combination with transmitter 910 or 1030, transmit a CA configuration and an auxiliary UL configuration for the UE; the CA configuration may include one or more carriers configured for UL data transmissions and the auxiliary UL configuration including one or more carriers configured for UL reference signal transmissions. The carrier configuration component 1130 may, in combination with transmitter 910 or 1030, transmit a second auxiliary configuration for a second TAG, where the auxiliary UL configuration is associated with a first TAG.

Figure 12:
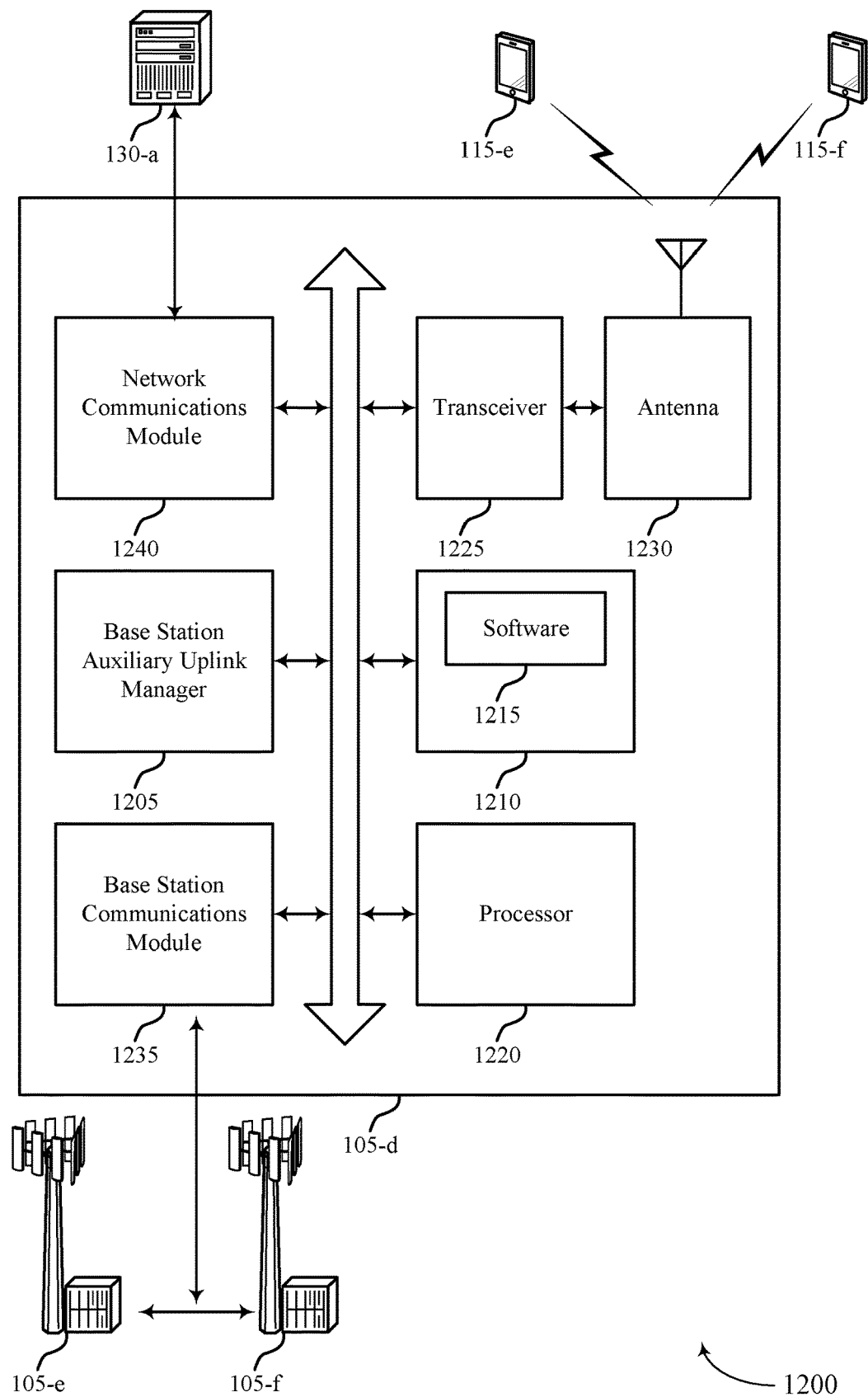
FIG. 12 illustrates a block diagram of a system including a base station that supports SRS under asymmetric eCA in accordance with aspects of the present disclosure.

FIG. 12 shows a diagram of a wireless system 1200 including a device configured that supports SRS under asymmetric eCA in accordance with various aspects of the present disclosure. For example, wireless system 1200 may include base station 105-d, which may be an example of a wireless device 900, a wireless device 1000, or a base station 105 as described with reference to FIGS. 1, 2 and 9 through 11. Base station 105-d may also include components for bi-directional voice and data communications including components for transmitting communications and components for receiving communications. For example, base station 105-d may communicate bi-directionally with one or more UEs 115.

Base station 105-d may also include base station auxiliary uplink manager 1205, memory 1210, processor 1220, transceiver 1225, antenna 1230, base station communications module 1235 and network communications module 1240. Each of these modules may communicate, directly or indirectly, with one another (e.g., via one or more buses). The base station auxiliary uplink manager 1205 may be an example of a base station auxiliary uplink manager as described with reference to FIGS. 9 through 11.

The memory 1210 may include RAM and ROM. The memory 1210 may store computer-readable, computer-executable software including instructions that, when executed, cause the processor to perform various functions described herein (e.g., SRS under asymmetric eCA, etc.). In some cases, the software 1215 may not be directly executable by the processor but may cause a computer (e.g., when compiled and executed) to perform functions described herein. The processor 1220 may include an intelligent hardware device, (e.g., a CPU, a microcontroller, an ASIC, etc.)

The transceiver 1225 may communicate bi-directionally, via one or more antennas, wired, or wireless links, with one or more networks, as described herein. For example, the transceiver 1225 may communicate bi-directionally with a base station 105 or a UE 115. The transceiver 1225 may also include a modem to modulate the packets and provide the modulated packets to the antennas for transmission, and to demodulate packets received from the antennas. In some cases, the wireless device may include a single antenna 1230. However, in some cases the device may have more than one antenna 830, which may be capable of concurrently transmitting or receiving multiple wireless transmissions.

The base station communications module 1235 may manage communications with other base station 105, and may include a controller or scheduler for controlling communications with UEs 115 in cooperation with other base stations 105. For example, the base station communications module 1235 may coordinate scheduling for transmissions to UEs 115 for various interference mitigation techniques such as beamforming or joint transmission. In some examples, base station communications module-95 may provide an X2 interface within an LTE/LTE-A wireless communication network technology to provide communication between base stations 105.

The network communications module 1240 may manage communications with the core network (e.g., via one or more wired backhaul links). For example, the network communications module 1240 may manage the transfer of data communications for client devices, such as one or more UEs 115.

Figure 13:
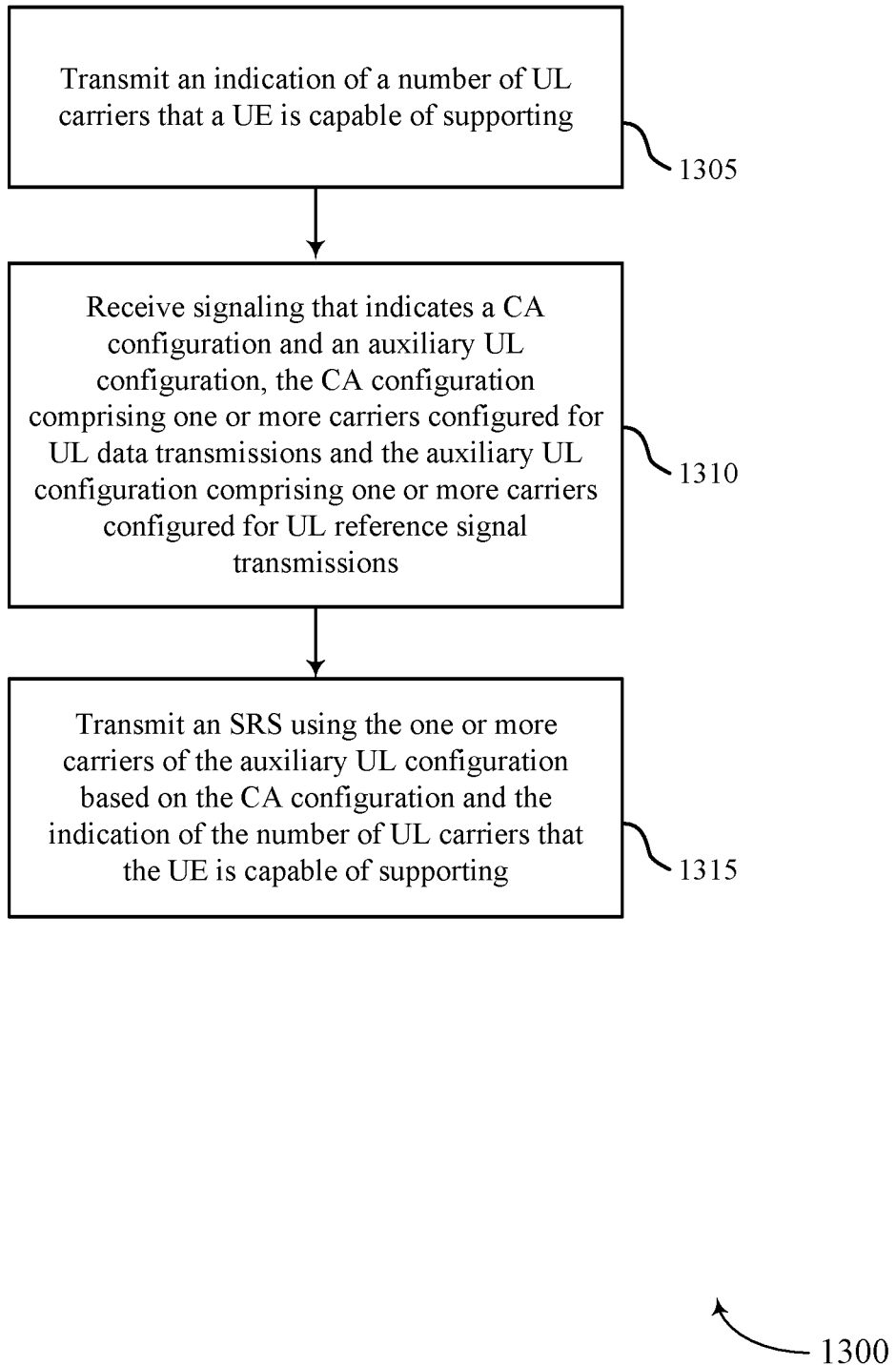
FIGS. 13 through 19 illustrate methods for SRS under asymmetric eCA in accordance with aspects of the present disclosure.

FIG. 13 shows a flowchart illustrating a method 1300 for SRS under asymmetric eCA in accordance with various aspects of the present disclosure. The operations of method 1300 may be implemented by a device such as a UE 115 or its components as described with reference to FIGS. 1 and 2. For example, the operations of method 1300 may be performed by the UE auxiliary uplink manager as described herein. In some examples, the UE 115 may execute a set of codes to control the functional elements of the device to perform the functions described below. Additionally or alternatively, the UE 115 may perform aspects the functions described below using special-purpose hardware.

At block 1305, the UE 115 may transmit an indication of a UE capability as described herein with reference to FIGS. 2 through 4. In certain examples, the operations of block 1305 may be performed by the capability indication component as described with reference to FIGS. 6 and 7.

At block 1310, the UE 115 may receive signaling that indicates a CA configuration and an auxiliary UL configuration, the CA configuration including one or more carriers configured for UL data transmissions and the auxiliary UL configuration including one or more carriers configured for UL reference signal transmissions as described herein with reference to FIGS. 2 through 4. In certain examples, the operations of block 1310 may be performed by the carrier configuration component as described with reference to FIGS. 6 and 7.

At block 1315, the UE 115 may transmit a SRS using the one or more carriers of the auxiliary UL configuration based on the CA configuration and the UE capability as described herein with reference to FIGS. 2 through 4. In certain examples, the operations of block 1315 may be performed by the SRS component as described with reference to FIGS. 6 and 7.

Figure 14:
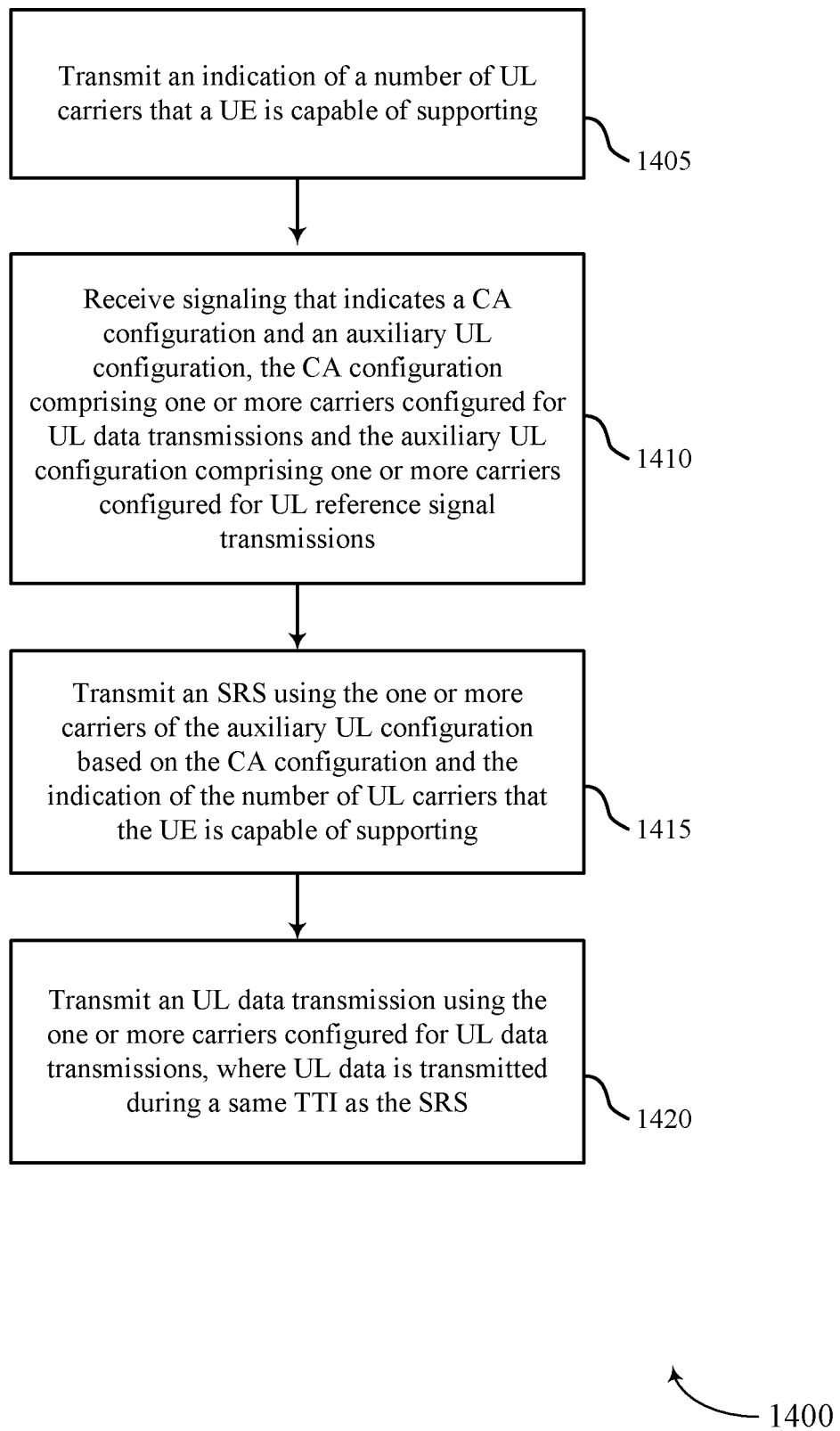

FIG. 14 shows a flowchart illustrating a method 1400 for SRS under asymmetric eCA in accordance with various aspects of the present disclosure. The operations of method 1400 may be implemented by a device such as a UE 115 or its components as described with reference to FIGS. 1 and 2. For example, the operations of method 1400 may be performed by the UE auxiliary uplink manager as described herein. In some examples, the UE 115 may execute a set of codes to control the functional elements of the device to perform the functions described below. Additionally or alternatively, the UE 115 may perform aspects the functions described below using special-purpose hardware.

At block 1405, the UE 115 may transmit an indication of a UE capability as described herein with reference to FIGS. 2 through 4. In certain examples, the operations of block 1405 may be performed by the capability indication component as described with reference to FIGS. 6 and 7.

At block 1410, the UE 115 may receive signaling that indicates a CA configuration and an auxiliary UL configuration, the CA configuration including one or more carriers configured for UL data transmissions and the auxiliary UL configuration including one or more carriers configured for UL reference signal transmissions as described herein with reference to FIGS. 2 through 4. In certain examples, the operations of block 1410 may be performed by the carrier configuration component as described with reference to FIGS. 6 and 7.

At block 1415, the UE 115 may transmit a SRS using the one or more carriers of the auxiliary UL configuration based on the CA configuration and the UE capability as described herein with reference to FIGS. 2 through 4. In certain examples, the operations of block 1415 may be performed by the SRS component as described with reference to FIGS. 6 and 7.

At block 1420, the UE 115 may transmit an UL data transmission on the one or more carriers configured for UL data transmissions, where UL data is transmitted during a same TTI as the SRS as described herein with reference to FIGS. 2 through 4. In certain examples, the operations of block 1420 may be performed by the UL data component as described with reference to FIGS. 6 and 7.

Figure 15:
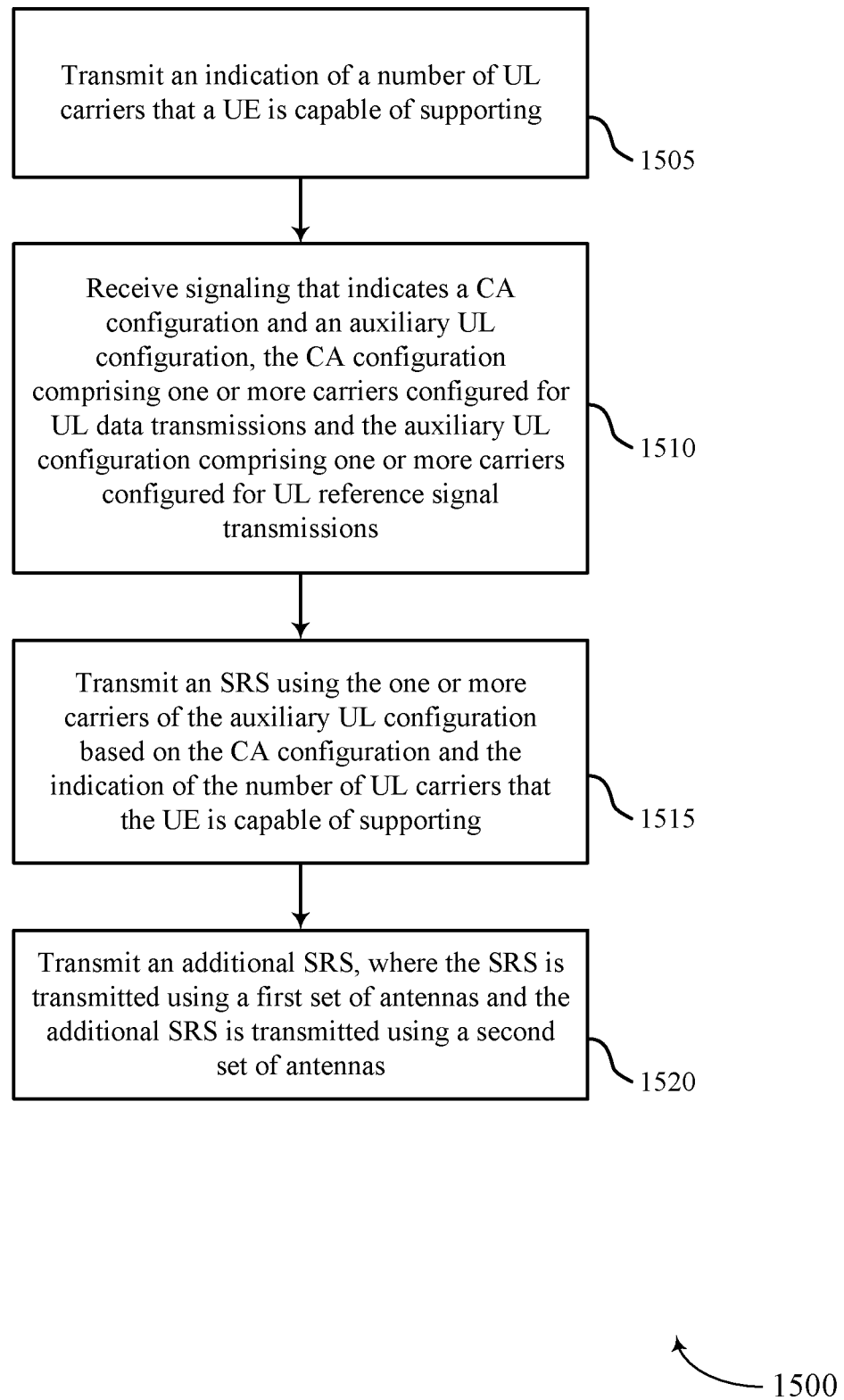

FIG. 15 shows a flowchart illustrating a method 1500 for SRS under asymmetric eCA in accordance with various aspects of the present disclosure. The operations of method 1500 may be implemented by a device such as a UE 115 or its components as described with reference to FIGS. 1 and 2. For example, the operations of method 1500 may be performed by the UE auxiliary uplink manager as described herein. In some examples, the UE 115 may execute a set of codes to control the functional elements of the device to perform the functions described below. Additionally or alternatively, the UE 115 may perform aspects the functions described below using special-purpose hardware.

At block 1505, the UE 115 may transmit an indication of a UE capability as described herein with reference to FIGS. 2 through 4. In certain examples, the operations of block 1505 may be performed by the capability indication component as described with reference to FIGS. 6 and 7.

At block 1510, the UE 115 may receive signaling that indicates a CA configuration and an auxiliary UL configuration, the CA configuration including one or more carriers configured for UL data transmissions and the auxiliary UL configuration including one or more carriers configured for UL reference signal transmissions as described herein with reference to FIGS. 2 through 4. In certain examples, the operations of block 1510 may be performed by the carrier configuration component as described with reference to FIGS. 6 and 7.

At block 1515, the UE 115 may transmit a SRS using the one or more carriers of the auxiliary UL configuration based on the CA configuration and the UE capability as described herein with reference to FIGS. 2 through 4. In certain examples, the operations of block 1515 may be performed by the SRS component as described with reference to FIGS. 6 and 7.

At block 1520, the UE 115 may transmit an additional SRS, where the SRS is transmitted using a first set of antennas and the additional SRS is transmitted using a second set of antennas as described herein with reference to FIGS. 2 through 4. In certain examples, the operations of block 1520 may be performed by the SRS component as described with reference to FIGS. 6 and 7.

Figure 16:
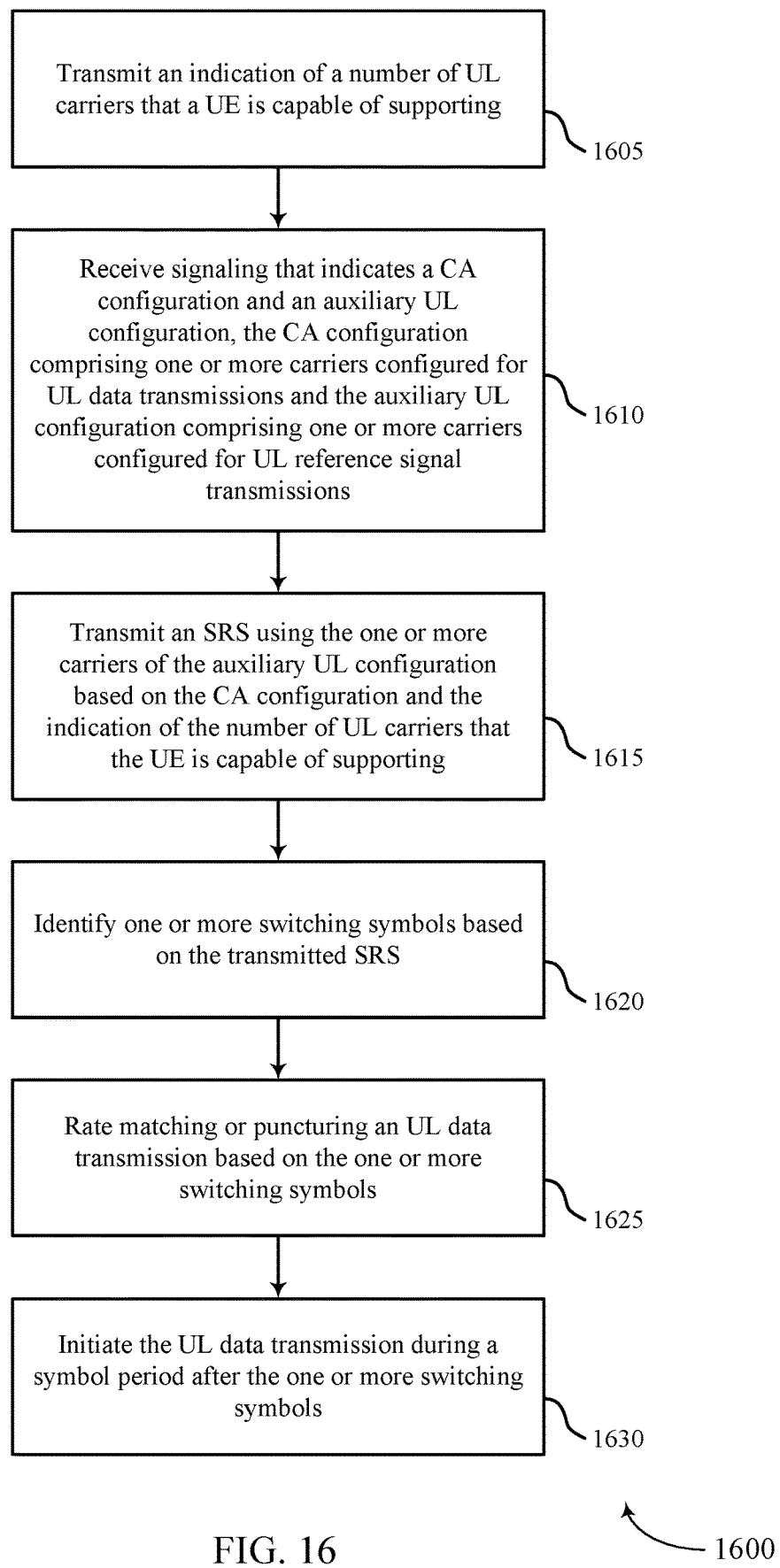

FIG. 16 shows a flowchart illustrating a method 1600 for SRS under asymmetric eCA in accordance with various aspects of the present disclosure. The operations of method 1600 may be implemented by a device such as a UE 115 or its components as described with reference to FIGS. 1 and 2. For example, the operations of method 1600 may be performed by the UE auxiliary uplink manager as described herein. In some examples, the UE 115 may execute a set of codes to control the functional elements of the device to perform the functions described below. Additionally or alternatively, the UE 115 may perform aspects the functions described below using special-purpose hardware.

At block 1605, the UE 115 may transmit an indication of a UE capability as described herein with reference to FIGS. 2 through 4. In certain examples, the operations of block 1605 may be performed by the capability indication component as described with reference to FIGS. 6 and 7.

At block 1610, the UE 115 may receive signaling that indicates a CA configuration and an auxiliary UL configuration, the CA configuration including one or more carriers configured for UL data transmissions and the auxiliary UL configuration including one or more carriers configured for UL reference signal transmissions as described herein with reference to FIGS. 2 through 4. In certain examples, the operations of block 1610 may be performed by the carrier configuration component as described with reference to FIGS. 6 and 7.

At block 1615, the UE 115 may transmit a SRS using the one or more carriers of the auxiliary UL configuration based on the CA configuration and the UE capability as described herein with reference to FIGS. 2 through 4. In certain examples, the operations of block 1615 may be performed by the SRS component as described with reference to FIGS. 6 and 7.

At block 1620, the UE 115 may identify one or more switching symbols based on the transmitted SRS or a location of the SRS, or both as described herein with reference to FIGS. 2 through 4. In certain examples, the operations of block 1620 may be performed by the switching symbol component as described with reference to FIGS. 6 and 7.

At block 1625, the UE 115 may rate match or puncture an UL data transmission based on the one or more switching symbols as described herein with reference to FIGS. 2 through 4. In certain examples, the operations of block 1625 may be performed by the rate matching component as described with reference to FIGS. 6 and 7.

At block 1630, the UE 115 may initiate the UL data transmission during a symbol period after the one or more switching symbols as described herein with reference to FIGS. 2 through 4. In certain examples, the operations of block 1630 may be performed by the UL data component as described with reference to FIGS. 6 and 7.

Figure 17:
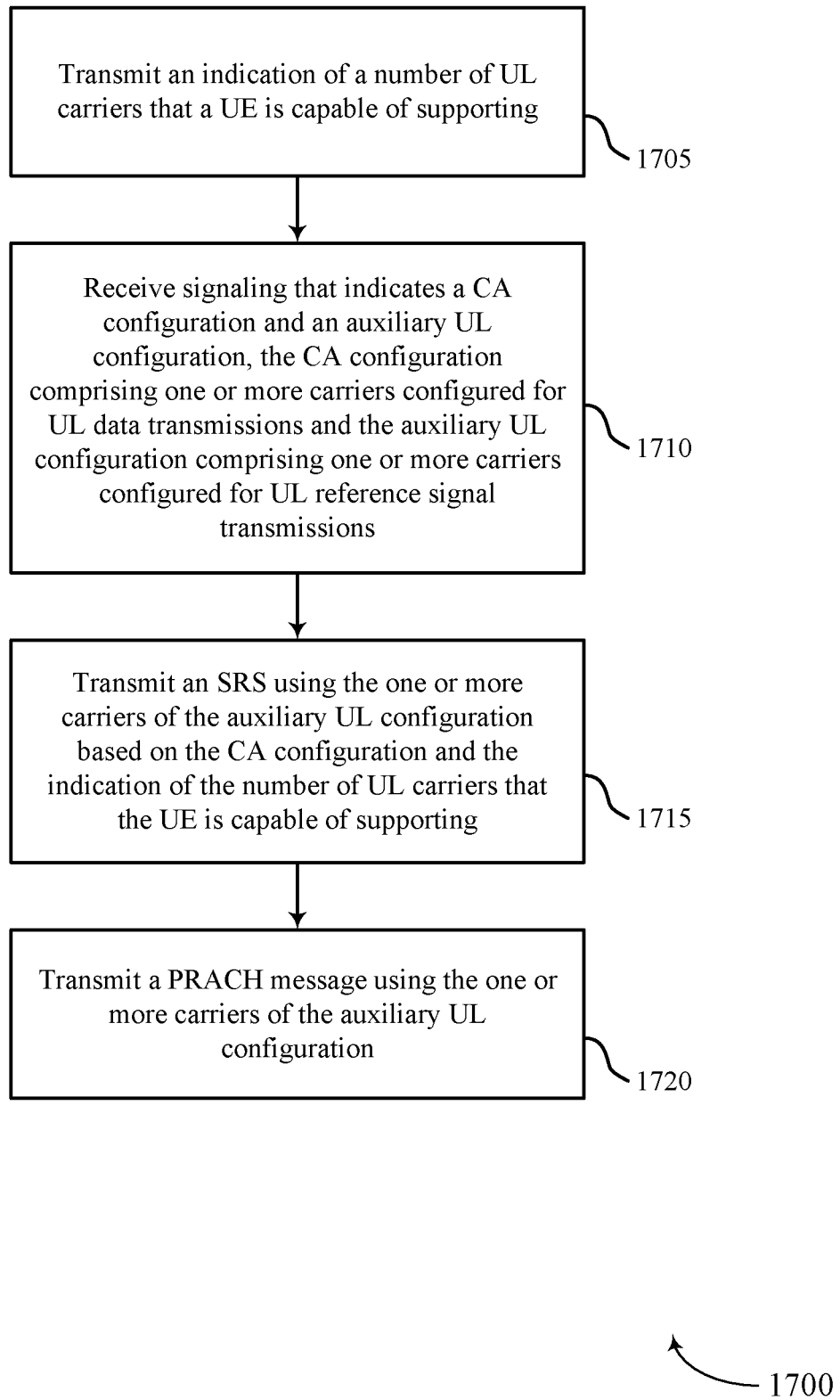

FIG. 17 shows a flowchart illustrating a method 1700 for SRS under asymmetric eCA in accordance with various aspects of the present disclosure. The operations of method 1700 may be implemented by a device such as a UE 115 or its components as described with reference to FIGS. 1 and 2. For example, the operations of method 1700 may be performed by the UE auxiliary uplink manager as described herein. In some examples, the UE 115 may execute a set of codes to control the functional elements of the device to perform the functions described below. Additionally or alternatively, the UE 115 may perform aspects the functions described below using special-purpose hardware.

At block 1705, the UE 115 may transmit an indication of a UE capability as described herein with reference to FIGS. 2 through 4. In certain examples, the operations of block 1705 may be performed by the capability indication component as described with reference to FIGS. 6 and 7.

At block 1710, the UE 115 may receive signaling that indicates a CA configuration and an auxiliary UL configuration, the CA configuration including one or more carriers configured for UL data transmissions and the auxiliary UL configuration including one or more carriers configured for UL reference signal transmissions as described herein with reference to FIGS. 2 through 4. In certain examples, the operations of block 1710 may be performed by the carrier configuration component as described with reference to FIGS. 6 and 7.

At block 1715, the UE 115 may transmit a SRS using the one or more carriers of the auxiliary UL configuration based on the CA configuration and the UE capability as described herein with reference to FIGS. 2 through 4. In certain examples, the operations of block 1715 may be performed by the SRS component as described with reference to FIGS. 6 and 7.

At block 1720, the UE 115 may transmit a PRACH message on the one or more carriers of the auxiliary UL configuration as described herein with reference to FIGS. 2 through 4. In certain examples, the operations of block 1720 may be performed by the RACH component as described with reference to FIGS. 6 and 7.

Figure 18:
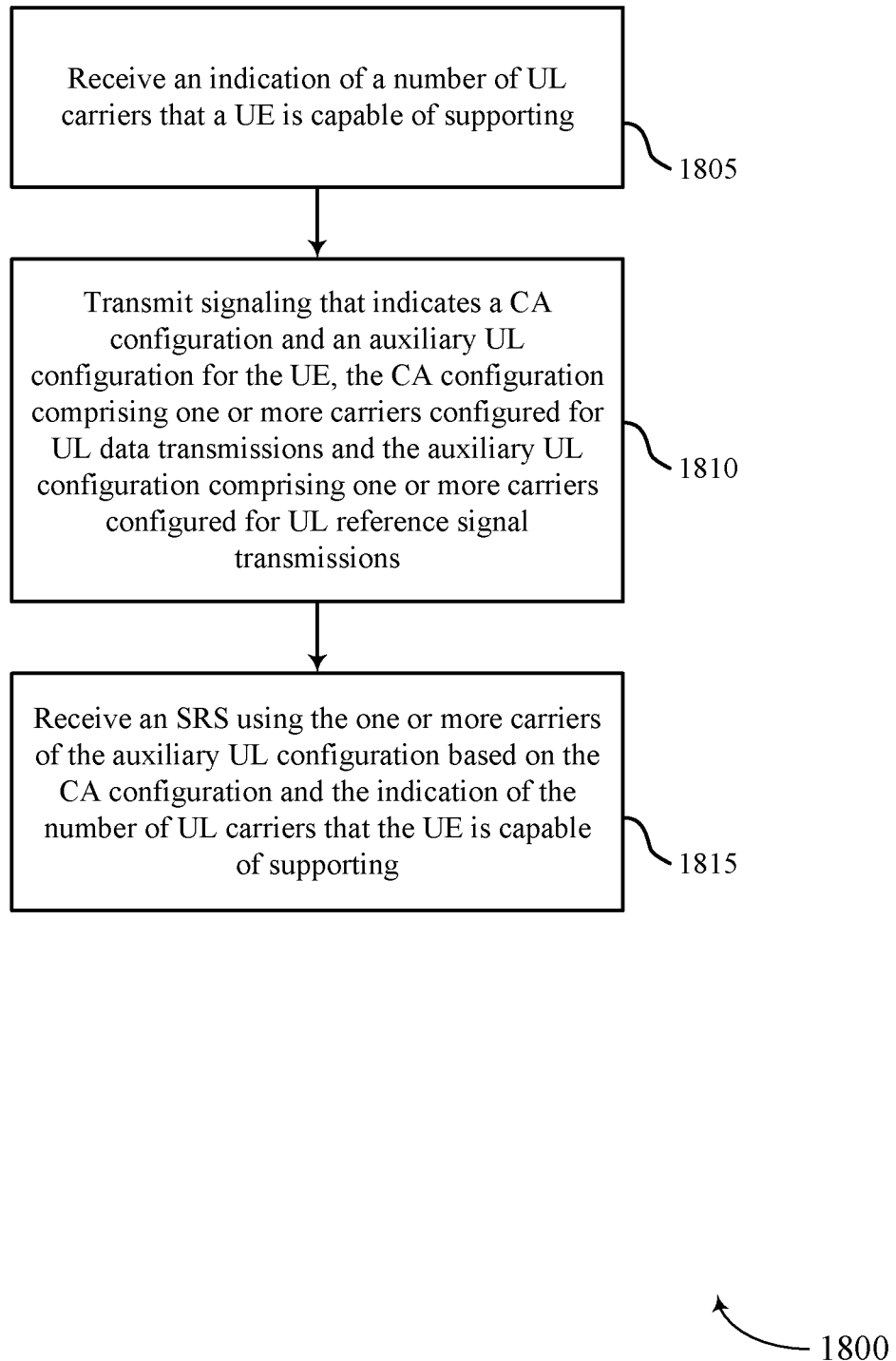

FIG. 18 shows a flowchart illustrating a method 1800 for SRS under asymmetric eCA in accordance with various aspects of the present disclosure. The operations of method 1800 may be implemented by a device such as a base station 105 or its components as described with reference to FIGS. 1 and 2. For example, the operations of method 1800 may be performed by the base station auxiliary uplink manager as described herein. In some examples, the base station 105 may execute a set of codes to control the functional elements of the device to perform the functions described below. Additionally or alternatively, the base station 105 may perform aspects the functions described below using special-purpose hardware.

At block 1805, the base station 105 may receive an indication of a UE capability as described herein with reference to FIGS. 2 through 4. In certain examples, the operations of block 1805 may be performed by the capability identification component as described with reference to FIGS. 10 and 11.

At block 1810, the base station 105 may transmit signaling that indicates a CA configuration and an auxiliary UL configuration for the UE, the CA configuration including one or more carriers configured for UL data transmissions and the auxiliary UL configuration including one or more carriers configured for UL reference signal transmissions as described herein with reference to FIGS. 2 through 4. In certain examples, the operations of block 1810 may be performed by the carrier configuration component as described with reference to FIGS. 10 and 11.

At block 1815, the base station 105 may receive a SRS using the one or more carriers of the auxiliary UL configuration based on the CA configuration and the UE capability as described herein with reference to FIGS. 2 through 4. In certain examples, the operations of block 1815 may be performed by the SRS component as described with reference to FIGS. 10 and 11.

Figure 19:
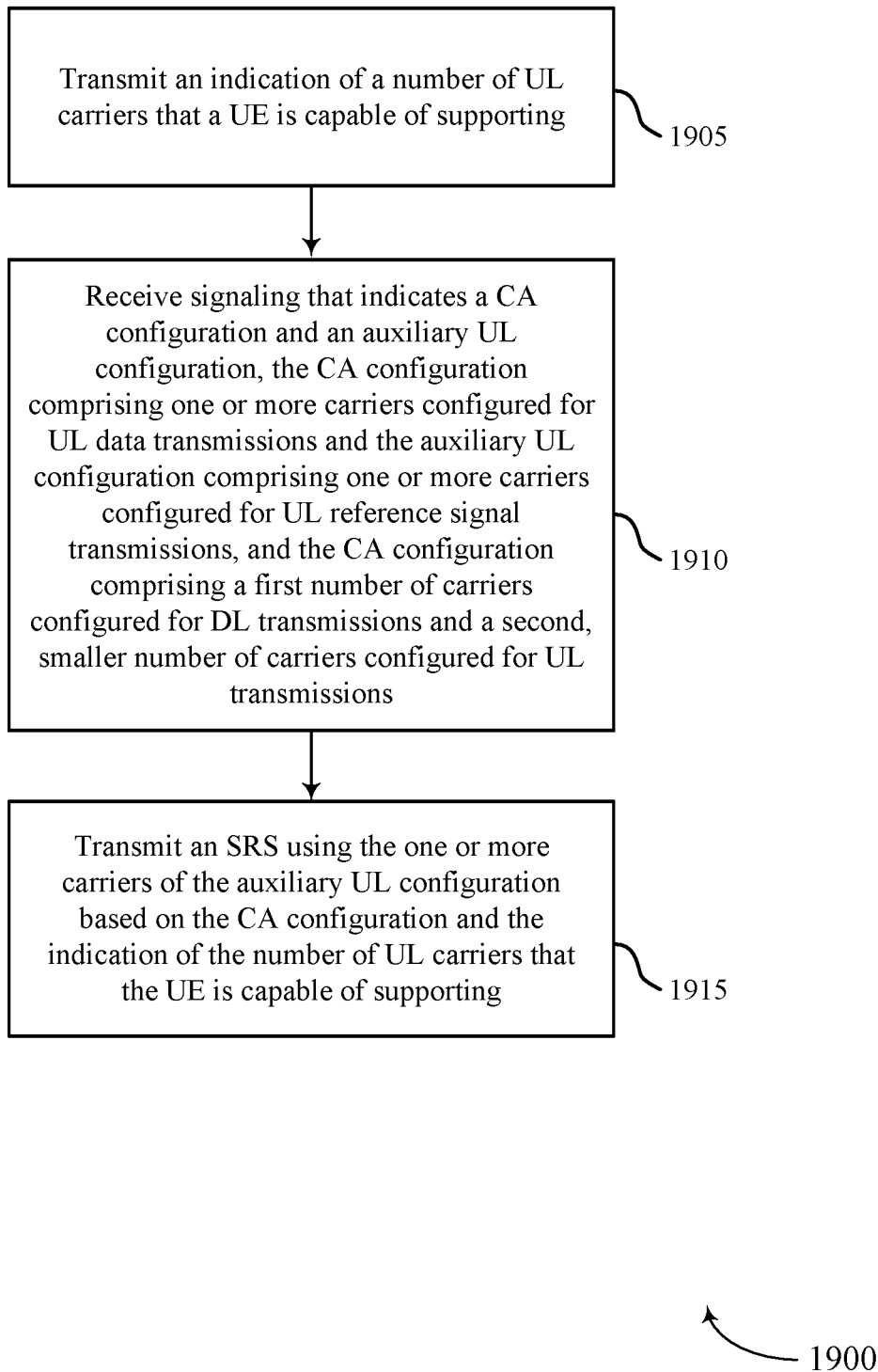

FIG. 19 shows a flowchart illustrating a method 1900 for SRS under asymmetric eCA in accordance with various aspects of the present disclosure. The operations of method 1900 may be implemented by a device such as a UE 115 or its components as described with reference to FIGS. 1 and 2. For example, the operations of method 1900 may be performed by the UE auxiliary uplink manager as described herein. In some examples, the UE 115 may execute a set of codes to control the functional elements of the device to perform the functions described below. Additionally or alternatively, the UE 115 may perform aspects the functions described below using special-purpose hardware.

At block 1905, the UE 115 may transmit an indication of a UE capability as described herein with reference to FIGS. 2 through 4. In certain examples, the operations of block 1905 may be performed by the capability indication component as described with reference to FIGS. 6 and 7.

At block 1910, the UE 115 may receive signaling that indicates a CA configuration and an auxiliary UL configuration. The CA configuration may include one or more carriers configured for UL data transmissions and the auxiliary UL configuration including one or more carriers configured for UL reference signal transmissions, and the CA configuration may include a first number of carriers configured of DL transmissions and a second number of carriers configured for UL transmissions, where the first number is greater than the second number such that there is an asymmetry in UL and DL CCs of a CA configuration, as described herein with reference to FIGS. 2 through 4. In certain examples, the operations of block 1910 may be performed by the carrier configuration component as described with reference to FIGS. 6 and 7.

At block 1915, the UE 115 may transmit a SRS using the one or more carriers of the auxiliary UL configuration based on the CA configuration and the UE capability as described herein with reference to FIGS. 2 through 4. In certain examples, the operations of block 1915 may be performed by the SRS component as described with reference to FIGS. 6 and 7.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for SRS under eCA, which may be an alternative term for CA or other multi-carrier configurations with aggregated CCs.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or CC associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using FDD (e.g., using paired spectrum resources) or TDD operation (e.g., using unpaired spectrum resources). Frame structures may be defined for FDD (e.g., frame structure type 1) and TDD (e.g., frame structure type 2).

Thus, aspects of the disclosure may provide for SRS under asymmetric eCA. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:
1. A method for wireless communication, comprising:
   transmitting an indication of a user equipment (UE) capability, wherein the UE capability includes at least an uplink (UL) carrier aggregation (CA) capability of the UE;

receiving a CA configuration and an auxiliary UL configuration, the CA configuration comprising one or more carriers configured for UL data transmissions and the auxiliary UL configuration comprising one or more carriers configured for UL reference signal transmissions;

transmitting, based on the CA configuration and the UL CA capability of the UE, a sounding reference signal (SRS) using the one or more carriers of the auxiliary UL configuration;

identifying one or more switching symbols based at least in part on a location of the SRS relative to other symbols of the subframe;

puncturing an UL data transmission based at least in part on the one or more switching symbols; and transmitting, during a symbol period after the one or more switching symbols, the UL data transmission using the one or more carriers configured for UL data transmissions.

2. The method of claim 1, wherein the CA configuration comprises a first number of carriers configured for downlink (DL) transmission, wherein the first number is greater than a second number of the one or more carriers configured for UL data transmissions.

3. The method of claim 1, wherein the indication of the UE capability comprises an indication of a switching time associated with tuning between a carrier configured for UL data transmission and a carrier configured for UL reference signal transmission, and the one or more switching symbols are based at least in part on the switching time.

4. The method of claim 1, wherein the UL data transmission on the one or more carriers configured for UL data transmissions is transmitted during a same transmission time interval (TTI) as the SRS.

5. The method of claim 1, wherein the one or more carriers configured for UL data transmissions comprise at least one carrier configured for time division duplexing (TDD).

6. The method of claim 1, further comprising:
transmitting an additional SRS, wherein the SRS is transmitted using a first set of antennas and the additional SRS is transmitted using a second set of antennas.

7. The method of claim 6, wherein the first set of antennas is selected for transmissions on the one or more carriers used for the SRS and the second set of antennas is selected for transmissions on an additional carrier used for the additional SRS.

8. The method of claim 6, wherein the SRS is a periodic SRS or an aperiodic SRS and the additional SRS is a periodic SRS or an aperiodic SRS, and wherein the first set of antennas is selected based at least in part on the SRS being the periodic SRS and the second set of antennas is selected based at least in part on the additional SRS being the aperiodic SRS.

9. The method of claim 8, further comprising:
receiving radio resource control (RRC) signaling or downlink control information (DCI), wherein the first set of antennas or the second set of antennas is selected based at least in part on the RRC signaling or the DCI.

10. The method of claim 1, further comprising:
transmitting a physical random access channel (PRACH) message on the one or more carriers of the auxiliary UL configuration.

11. The method of claim 1, further comprising:
receiving a second auxiliary configuration for a second timing adjustment group (TAG), wherein the auxiliary UL configuration is associated with a first TAG.

12. The method of claim 1, wherein the CA configuration comprises the auxiliary UL configuration.

13. The method of claim 1, wherein the auxiliary UL configuration is distinct from the CA configuration.

14. The method of claim 1, wherein the CA configuration is part of a dual-connectivity configuration.

15. The method of claim 1, wherein the one or more carriers configured for UL data transmissions comprise carriers of a first timing adjustment group (TAG) and the one or more carriers configured for UL reference signals comprise carriers of a second TAG.

16. A method for wireless communication, comprising:
receiving an indication of a user equipment (UE) capability, wherein the UE capability includes at least an uplink (UL) carrier aggregation (CA) capability of the UE;

transmitting a CA configuration and an auxiliary UL configuration for the UE, the CA configuration comprising one or more carriers configured for UL data transmissions by the UE and the auxiliary UL configuration comprising one or more carriers configured for UL reference signal transmissions by the UE;

receiving, based on the CA configuration and the UL CA capability of the UE, a sounding reference signal (SRS) using the one or more carriers of the auxiliary UL configuration;

identifying one or more switching symbols based at least in part on a location of the SRS relative to other symbols of the subframe; and receiving, from the UE, an UL data transmission on the one or more carriers configured for UL data transmissions, wherein the UL data transmission from the UE is received during a symbol period after the one or more switching symbols.

17. The method of claim 16, wherein the CA configuration comprises a first number of carriers configured for downlink (DL) transmission, wherein the first number is greater than a second number of the one or more carriers configured for UL data transmissions.

18. The method of claim 16, wherein the UL data transmission on the one or more carriers configured for UL data transmissions is received during a same transmission time interval (TTI) as the SRS.

19. The method of claim 16, wherein the indication of the UE capability comprises an indication of a switching time associated with tuning between a carrier configured for UL data transmission and a carrier configured for UL reference signal transmission, and the one or more switching symbols are based at least in part on the switching time.

20. The method of claim 16, further comprising:
receiving a physical random access channel (PRACH) message from the UE on one or more carriers of the auxiliary UL configuration.

21. The method of claim 16, further comprising:
transmitting a second auxiliary configuration for a second timing adjustment group (TAG), wherein the auxiliary UL configuration is associated with a first TAG.

22. A mobile device for wireless communication, comprising:
a processor;
memory coupled to the processor; and
instructions stored in the memory and operable, when executed by the processor, to cause the mobile device to:

transmit an indication of a mobile device capability, wherein the mobile device capability includes at least an uplink (UL) carrier aggregation (CA) capability of the mobile device;

receive a CA configuration and an auxiliary UL configuration, the CA configuration comprising one or more carriers configured for UL data transmissions and the auxiliary UL configuration comprising one or more carriers configured for UL reference signal transmissions;

transmit, based on the CA configuration and the UL CA capability of the UE, a sounding reference signal (SRS) on the one or more carriers of the auxiliary UL configuration;

identify one or more switching symbols based at least in part on a location of the SRS relative to other symbols of the subframe;

puncture an UL data transmission based at least in part on the one or more switching symbols; and transmit, during a symbol period after the one or more switching symbols, the UL data transmission using the one or more carriers configured for UL data transmissions.

23. The mobile device of claim 22, wherein the CA configuration comprises a first number of carriers configured for downlink (DL) transmission, wherein the first number is greater than a second number of the one or more carriers configured for UL data transmissions.

24. The mobile device of claim 22, wherein the instructions are executable by the processor to cause the mobile device to:

transmit the UL data transmission on the one or more carriers configured for UL data transmissions during a same transmission time interval (TTI) as the SRS.

25. A network device for wireless communication, in a system comprising:

a processor;

memory coupled to the processor; and instructions stored in the memory and operable, when executed by the processor, to cause the network device to:

receive an indication of a user equipment (UE) capability, wherein the UE capability includes at least an uplink (UL) carrier aggregation (CA) capability of the UE;

transmit a CA configuration and an auxiliary UL configuration for the UE, the CA configuration comprising one or more carriers configured for UL data transmissions and the auxiliary UL configuration comprising one or more carriers configured for UL reference signal transmissions;

receive, based on the CA configuration and the UL CA capability of the UE, a sounding reference signal (SRS) on the one or more carriers of the auxiliary UL configuration;

identify one or more switching symbols based at least in part on a location of the SRS relative to other symbols of the subframe; and receive, from the UE, an UL data transmission on the one or more carriers configured for UL data transmissions, wherein the UL data transmission from the UE is received during a symbol period after the one or more switching symbols.

26. The network device of claim 25, wherein the CA configuration comprises a first number of carriers configured for downlink (DL) transmission, wherein the first number is greater than a second number of the one or more carriers configured for UL data transmissions.

* * * * *